(12) United States Patent
Kim et al.

(10) Patent No.: US 11,422,673 B2
(45) Date of Patent: Aug. 23, 2022

(54) ELECTRONIC APPARATUS AND CONTROL METHOD THEREOF

(71) Applicant: SAMSUNG ELECTRONICS CO., LTD., Suwon-si (KR)

(72) Inventors: Yongku Kim, Suwon-si (KR); Seokho Ban, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/920,494

(22) Filed: Jul. 3, 2020

(65) Prior Publication Data

US 2021/0389865 A1 Dec. 16, 2021

(30) Foreign Application Priority Data

Jun. 12, 2020 (KR) .................. 10-2020-0071889
Jul. 3, 2020 (KR) .................. 10-2020-0082010

(51) Int. Cl.
*G06F 3/04817* (2022.01)
*G09G 5/37* (2006.01)

(52) U.S. Cl.
CPC .......... *G06F 3/04817* (2013.01); *G09G 5/37* (2013.01); *G09G 2340/0471* (2013.01); *G09G 2340/0478* (2013.01); *G09G 2354/00* (2013.01)

(58) Field of Classification Search
CPC .............. G06F 3/04817; G09G 5/37; G09G 2340/0471; G09G 2340/0478; G09G 2354/00
See application file for complete search history.

(56) References Cited

U.S. PATENT DOCUMENTS

| | | | |
|---|---|---|---|
| 8,300,065 B2 | 10/2012 | Kim et al. | |
| 9,307,294 B2 | 4/2016 | Hiyoshi et al. | |
| 9,448,720 B2 | 9/2016 | Kim et al. | |
| 10,205,884 B2 | 2/2019 | Song et al. | |
| 10,587,903 B2 | 3/2020 | Park et al. | |
| 2008/0059888 A1* | 3/2008 | Dunko | G06F 1/1613 715/744 |

(Continued)

FOREIGN PATENT DOCUMENTS

| | | |
|---|---|---|
| CN | 103901901 A | 7/2014 |
| CN | 103984563 A | 8/2014 |

(Continued)

OTHER PUBLICATIONS

Communication dated Jan. 5, 2021, issued by the National Intellectual Property Administration of P.R> China in Chinese Application No. 202010730715.8.

(Continued)

*Primary Examiner* — Justin S Lee
(74) *Attorney, Agent, or Firm* — Sughrue Mion, PLLC

(57) ABSTRACT

An electronic apparatus and a control method thereof include obtaining usage history for a plurality of applications in a horizontal display mode and a vertical display mode of a display, displaying a plurality of first icons corresponding to the plurality of applications in a first sorted order, and displaying a plurality of second icons corresponding to the plurality of applications in a second sorted order based on usage history for the plurality of applications in the vertical mode.

19 Claims, 19 Drawing Sheets

(56) References Cited

U.S. PATENT DOCUMENTS

| | | | |
|---|---|---|---|
| 2010/0287469 A1* | 11/2010 | Wang | G06F 1/1626 |
| | | | 715/702 |
| 2011/0252380 A1* | 10/2011 | Chaudhri | G06F 3/0482 |
| | | | 715/836 |
| 2013/0021379 A1* | 1/2013 | Sirpal | G06F 3/0483 |
| | | | 345/659 |
| 2013/0053105 A1 | 2/2013 | Lee et al. | |
| 2013/0227469 A1* | 8/2013 | Park | G06F 9/451 |
| | | | 715/788 |
| 2014/0368547 A1* | 12/2014 | Elings | G06F 3/0346 |
| | | | 345/659 |
| 2015/0029318 A1* | 1/2015 | Cho | G06F 3/005 |
| | | | 348/77 |
| 2015/0033263 A1 | 1/2015 | Hiyoshi et al. | |
| 2015/0153946 A1 | 6/2015 | Kim et al. | |
| 2015/0378520 A1 | 12/2015 | Chandrasekaran | |
| 2016/0048305 A1 | 2/2016 | Singal et al. | |
| 2016/0188135 A1 | 6/2016 | Lazaridis et al. | |
| 2016/0291837 A1* | 10/2016 | Chen | H04M 1/72472 |
| 2016/0328119 A1 | 11/2016 | Jing | |
| 2017/0289458 A1 | 10/2017 | Song et al. | |
| 2018/0032226 A1 | 2/2018 | Ryu et al. | |
| 2018/0081502 A1 | 3/2018 | Sangco et al. | |
| 2018/0146224 A1 | 5/2018 | Park et al. | |
| 2019/0019476 A1* | 1/2019 | Ge | G06F 1/1626 |
| 2019/0050964 A1 | 2/2019 | Jang et al. | |
| 2019/0391822 A1 | 12/2019 | Hua et al. | |
| 2020/0026419 A1 | 1/2020 | Jang et al. | |
| 2020/0177934 A1 | 6/2020 | Park et al. | |
| 2020/0380935 A1* | 12/2020 | Ignaszewski | G06F 1/1622 |
| 2021/0019010 A1* | 1/2021 | Yoganandan | G06F 3/0446 |
| 2021/0049128 A1* | 2/2021 | Kernick | G06F 16/162 |
| 2021/0173439 A1* | 6/2021 | Lee | G06F 3/147 |
| 2021/0203879 A1* | 7/2021 | Faulkner | G06F 3/1454 |

FOREIGN PATENT DOCUMENTS

| | | |
|---|---|---|
| CN | 104170396 A | 11/2014 |
| CN | 105630289 A | 6/2016 |
| CN | 105955583 A | 9/2016 |
| CN | 106406917 A | 2/2017 |
| CN | 106605198 A | 4/2017 |
| CN | 109871162 A | 6/2019 |
| CN | 111338533 A | 6/2020 |
| CN | 111601122 A | 8/2020 |
| JP | 4782074 B2 | 9/2011 |
| JP | 2019-160090 A | 9/2019 |
| KR | 2003-0057996 A | 7/2003 |
| KR | 10-0580174 B1 | 5/2006 |
| KR | 10-0704120 B1 | 4/2007 |
| KR | 10-2010-0047764 A | 5/2010 |
| KR | 10-2011-0117490 A | 10/2011 |
| KR | 10-2014-0096523 A | 8/2014 |
| KR | 10-2015-0063832 A | 6/2015 |
| KR | 10-2017-0112491 A | 10/2017 |
| KR | 10-2018-0057473 A | 5/2018 |
| KR | 10-2019-0017614 A | 2/2019 |
| KR | 10-2020-0054725 A | 5/2020 |

OTHER PUBLICATIONS

Communication dated Dec. 21, 2020, issued by the European Patent Office in European Application No. 20184288.7.
Communication dated Mar. 23, 2021, from the National Intellectual Property Administration of P.R. China in Chinese Application No. 202010730715.8.
International Search Report (PCT/ISA/210) dated Mar. 25, 2021 issued by the International Searching Authority in International Application No. PCT/KR2020/008796.
Written Opinion (PCT/ISA/237) dated Mar. 25, 2021 issued by the International Searching Authority in International Application No. PCT/KR2020/008796.
Communication dated Jul. 19, 2021, issued by the Korean Intellectual Property Office in Korean Application No. 10-2020-0082010.
Communication dated Jan. 10, 2022, issued by the Korean Intellectual Property Office in Korean Patent Application No. 10-2020-0082010.
Communication dated Mar. 28, 2022, issued by the European Patent Office in European Application No. 20184288.7.
Communication dated Jul. 7, 2022, issued by the Korean Intellectual Property Office in Korean Patent Application No. 10-2020-0082010.

* cited by examiner

ELECTRONIC APPARATUS AND CONTROL METHOD THEREOF

CROSS-REFERENCE TO RELATED APPLICATIONS

This application is based on and claims priority under 35 U.S.C. § 119 to Korean Patent Application No. 10-2020-0071889, filed on Jun. 12, 2020, and Korean Patent Application No. 10-2020-0082010, filed on Jul. 3, 2020, in the Korean Intellectual Property Office, the disclosure of which is incorporated by reference herein in its entirety.

BACKGROUND

1. Field

Apparatuses and methods consistent with the disclosure relate to an electronic apparatus and a control method thereof, and more particularly, to an electronic apparatus in which a display mode is operable as a horizontal mode (or a landscape mode) and a vertical mode (or a portrait mode), and a control method thereof.

2. Description of the Related Art

Recently, various electronic apparatuses have been developed, such as rotatable display apparatuses.

When a user command to control the electronic apparatus to perform rotation is input, a rotatable display apparatus may physical rotate a display arranged in a horizontal state to a vertical state or physically rotate the display arranged in the vertical state to the horizontal state.

In general, when the display rotates, the electronic apparatus simply rotates and displays an existing displayed image or changes and displays only an aspect ratio of the currently displayed image. In this case, a problem may arise that user convenience is not provided according to display modes of the display. Therefore, a necessity for providing content suitable for a horizontal mode and a vertical mode of the display has increased.

SUMMARY

Embodiments of the disclosure overcome the above disadvantages and other disadvantages not described above. Also, the disclosure is not required to overcome the disadvantages described above, and an embodiment of the disclosure may not overcome any of the problems described above.

The disclosure provides an electronic apparatus and a control method thereof for providing content corresponding to a display mode of a display.

According to an embodiment of the disclosure, an electronic apparatus includes: a rotatable display; a memory configured to store at least one instruction; and a processor configured to execute at least one instruction stored in the memory to control the electronic apparatus and to control the electronic apparatus to operate in a display mode among a horizontal mode and a vertical mode, wherein the processor obtains usage history for a plurality of applications in each display mode, controls the display to display a plurality of first icons corresponding to the plurality of applications in first sorted order based on the usage history for the plurality of applications in the horizontal mode based on a user command for creating a user interface (UI) input during an operation in the horizontal mode, and controls the display to display a plurality of second icons corresponding to the plurality of applications in second sorted order based on usage history for the plurality of applications in the vertical mode based on the display mode switched from the horizontal mode to the vertical mode.

According to another embodiment of the disclosure, a method of controlling an electronic apparatus includes: obtaining usage history for a plurality of applications in each display mode of a display; displaying a plurality of first icons corresponding to the plurality of applications in first sorted order based on the usage history for the plurality of applications in the horizontal mode based on a user command for creating a user interface (UI) input during an operation in the horizontal mode; and displaying a plurality of second icons corresponding to the plurality of applications in second sorted order based on usage history for the plurality of applications in the vertical mode based on the display mode switched from the horizontal mode to the vertical mode.

BRIEF DESCRIPTION OF THE DRAWINGS

The above and/or other aspects of the disclosure will be more apparent by describing certain embodiments of the disclosure with reference to the accompanying drawings, in which.

DETAILED DESCRIPTION OF THE EMBODIMENTS

Hereinafter, the disclosure will be described in detail with reference to the accompanying drawings.

An electronic apparatus 100 according to the disclosure may be realized as an electronic apparatus including a television (TV), a smart TV, a monitor, an electronic picture frame, an electronic blackboard, an electronic table, a laptop, a large format display (LFD), and the like and a display 120.

Figure 1A:
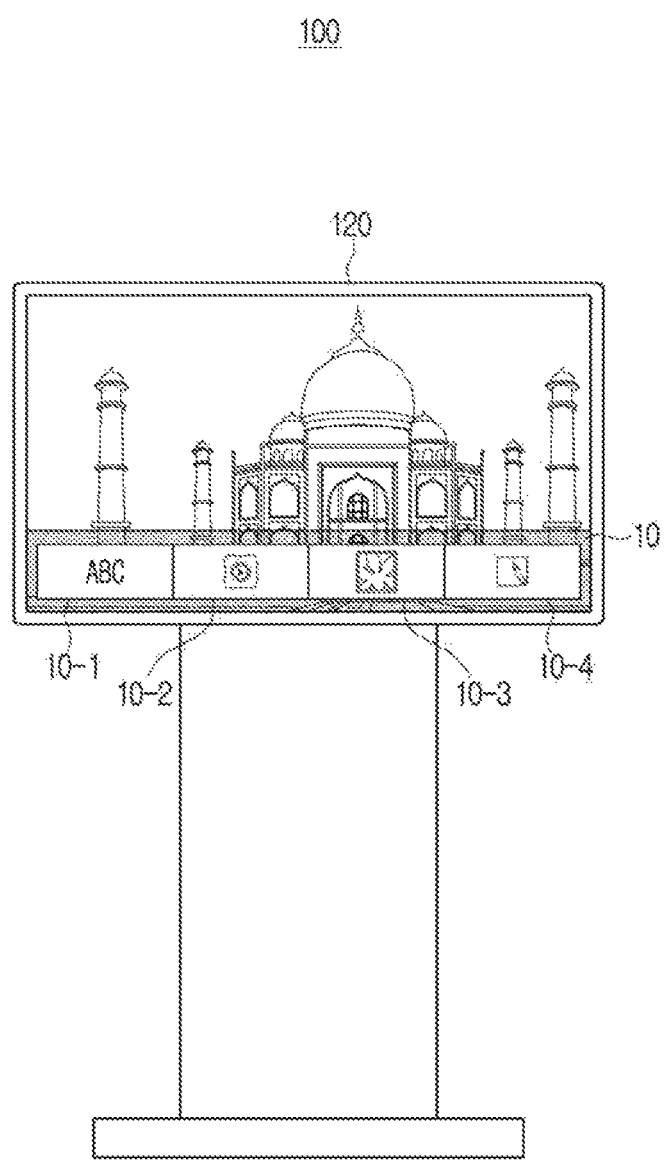
FIG. 1A is a diagram illustrating a plurality of icons displayed on a display while the display is operating in a horizontal mode according to an embodiment of the disclosure.
Figure 1B:
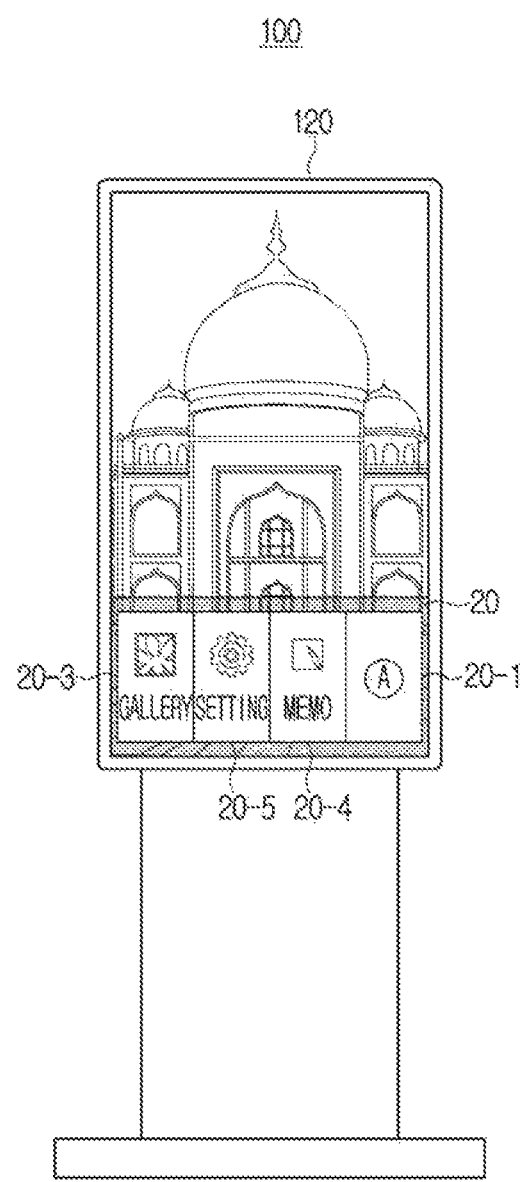
FIG. 1B is a diagram illustrating a plurality of icons displayed on a display while the display is operating in a vertical mode according to an embodiment of the disclosure.

The display 120 according to the disclosure may operate in one of a horizontal mode (horizontal display mode) and a vertical mode (vertical display mode). As an example, as illustrated in FIG. 1A, the horizontal mode may be a display mode in which the electronic apparatus 100 is physically oriented such that a horizontal length of the display 120 is longer than a vertical length as from the perspective of a viewer of the electronic apparatus 100. Here, the display mode of FIG. 1A may be referred to as a horizontal mode, but this may be merely an example, and this display mode may also be referred to as a horizontal orientation mode or a landscape mode. Conversely, as shown in FIG. 1B, the vertical mode may be a display mode in which the vertical length of the display 120 is longer than the horizontal length. Here, the display mode of FIG. 1B may be referred to as a vertical mode, but this may merely an example, and this display mode may be referred to as a vertical orientation mode or a portrait mode.

FIG. 1A is a diagram illustrating a plurality of icons displayed on the display 120 while the display 120 operates in a horizontal mode according to an embodiment of the disclosure.

The electronic apparatus 100 may obtain usage history for a plurality of applications in each display mode. That is, the electronic apparatus 100 may track usage history for the plurality of applications when the display 120 operates in the horizontal mode and may obtain usage history for the plurality of applications when the display 120 operates in the vertical mode. The plurality of applications may be applications installed in the electronic apparatus 100, but this is merely an example, and the plurality of applications may be applications installed in an external device or an external server connected to the electronic apparatus 100.

The electronic apparatus 100 may display a user interference (UI) 10 including a plurality of first icons 10-1, 10-2, 10-3, and 10-4 while the display 120 operates in the horizontal mode as shown in FIG. 1A. The electronic apparatus 100 may display the plurality of first icons 10-1, 10-2, 10-3, and 10-4 corresponding to a plurality of applications in a first sorted order based on the usage history for the plurality of applications corresponding when the electronic apparatus 100 operates while in the horizontal mode.

According to the disclosure, the UI 10, which provides a recommended application to a user when the display 120 is in the horizontal mode, may include a plurality of first icons 10-1, 10-2, 10-3, and 10-4 corresponding to the plurality of applications. According to an embodiment, the electronic apparatus 100 may display a plurality of first icons 10-1, 10-2, 10-3, and 10-4 in first sorted order based on usage history of the user for the plurality of applications in the horizontal mode.

According to the disclosure, the plurality of first icons 10-1, 10-2, 10-3, and 10-4 are icons provided in a horizontal mode and may correspond to the plurality of applications, respectively. Also, when an icon from among the plurality of first icons 10-1, 10-2, 10-3, and 10-4 is selected, an application corresponding to the selected icon may be executed. As an example, the electronic apparatus 100 may display a plurality of first icons 10-1, 10-2, 10-3, and 10-4 according to a layout corresponding to the horizontal mode. In an embodiment and consistent with the orientation of the electronic apparatus 100, the layout corresponding to the horizontal mode may have an aspect ratio in which a horizontal length is longer than a vertical length. In addition, as an example, each of the plurality of first icons 10-1, 10-2, 10-3, and 10-4 may include at least one of a thumbnail corresponding to each of the plurality of first icons 10-1, 10-2, 10-3, and 10-4, a name of the corresponding application, and a logo of the corresponding application. In an embodiment, the thumbnail for the application may be a graphic image representing the application or a trademark image corresponding to the application.

According to the disclosure, a first sorted order may be identified based on usage history for a plurality of applications when the electronic apparatus 100 operates in the horizontal mode.

In an embodiment, the first sorted order may be order of applications most frequently used during the horizontal mode from among a plurality of applications accessible to the electronic apparatus 100. Referring to FIG. 1A, the electronic apparatus 100 may display the 1-1 icon 10-1 corresponding to a first application most frequently used during the horizontal mode at a first position and display the 1-2 icon 10-2 corresponding to a second application which has been second most frequently used at a position adjacent to the 1-1 icon 10-1. Also, the electronic apparatus 100 may display the 1-3 icon 10-3 and 1-4 icon 10-4 corresponding to a third application and a fourth application which have been third and fourth most frequently used at subsequent positions in the horizontal mode. Here, usage history for each of the plurality of applications may be identified according to the number of instances in which the application has been executed in the past or a duration of time that each of the plurality of applications has been executed in the past.

In the above description, the first sorted order is described as being based on the most frequently used applications order during the horizontal mode among the plurality of applications, but the embodiment is not limited thereto.

In another embodiment, the first sorted order may be an order of most recently executed applications in the horizontal mode among the plurality of applications. That is, when in the horizontal mode, the electronic apparatus 100 may sort and display a plurality of icons in order of icons corresponding to the most recently executed applications on the UI 10.

In another embodiment, the first sorted order may be a popularity order for a plurality of applications in the horizontal mode. Specifically, the electronic apparatus 100 may receive usage history information for a plurality of applications in the horizontal mode from an external server. The usage history information received from the external server may be information on usage history that a plurality of applications were executed by external devices that access the server. That is, the external server may receive usage history of the plurality of applications in the plurality of external devices in the horizontal mode from the plurality of external devices and create usage history information for each of the applications. Also, the electronic apparatus 100 may receive the usage history information for the plurality of applications generated in the external server and identify the first sorted order based on the received usage history information.

In addition, as an embodiment, the first sorted order include the 1-1 sorted order according to the frequency of use order for the plurality of applications in horizontal mode and the 1-2 sorted order according the order of most recently executed applications in the horizontal mode. That is, the electronic device 100 displays a plurality of icons arranged in the 1-1 sorted order in the first area of the UI 10, and displays the plurality of icons arranged in the 1-2 sorted order in the second area of the UI 10.

In the above-described embodiment, the first sorted order is described as being identified through usage history of a plurality of applications corresponding to the horizontal mode, but is not limited thereto. That is, the first sorted order may be a preset sorted order in the electronic device 100. For example, the preset sorted order may be an application name order corresponding to each icon or an installation order of the plurality of applications corresponding to each icon. Also, the preset sorted order may be set by a user of electronic device 100 or may be set by a manufacturer of the electronic device 100.

FIG. 1B is a diagram illustrating a plurality of icons displayed on a display while the display is operating in a vertical mode according to an embodiment of the disclosure.

The electronic apparatus 100 may obtain usage history for a plurality of applications when the display 120 operates in the vertical mode.

In addition, the electronic apparatus 100 may display the UI 20 including a plurality of second icons 20-1, 20-2, 20-3, and 20-4 while the display 120 operates in the vertical mode as shown in FIG. 1B. Also, the electronic apparatus 100 may display the plurality of second icons 20-1, 20-3, 20-4 and 20-5 corresponding to the plurality of applications in second sorted order based on usage history for the plurality of applications corresponding to the vertical mode.

The UI 20 according to the disclosure is a UI for providing a recommended application to the user when the display 120 is in the vertical mode. The UI 20 may include the plurality of second icons 20-1, 20-3, 20-4 and 20-5 corresponding to the plurality of applications. According to an embodiment, the electronic apparatus 100 may sort and display the plurality of second icons 20-1, 20-3, 20-4, and 20-5 on the UI 20 in the second sorted order based on the user's usage history for the plurality of applications in a vertical mode.

According to the disclosure, the plurality of second icons 20-1, 20-3, 20-4, and 20-5 are icons provided in the vertical mode, which may correspond a plurality of applications, respectively. As an embodiment, the electronic apparatus 100 may display the plurality of second icons 20-1, 20-3, 20-4, and 20-5 based on a layout corresponding to the vertical mode. In an embodiment, the layout corresponding to the vertical mode may have an aspect ratio in which a vertical length is longer than that of a horizontal length. Further, as an example, each of the plurality of second icons 20-1, 20-3, 20-4, and 20-5 may include at least one of a thumbnail for the applications respectively corresponding to the plurality of second icons 20-1, 20-3, 20-4, and 20-5, a name of the corresponding application, and a logo of the corresponding application. Also, as an example, a first icon and a second icon corresponding to any one of the plurality of applications may be different from each other. That is, as described above, the first icon and the second icon corresponding to any one of the plurality of applications may have different layouts, and the second icon may include at least one of a thumbnail for the corresponding application, a name of the corresponding application, and a logo of the corresponding application not included in the first icon. In an embodiment, the 1-1 icon 10-1 corresponding to a first application includes a name (ABC) in the first application, but the 2-1 icon 20-1 may include a logo for the first application. Also, the 2-3 icon 20-3 corresponding to a third application may further include the name of the corresponding application compared to the 1-3 icon 10-3.

The second sorted order according to the disclosure may be identified based on usage history for a plurality of applications corresponding to the vertical mode.

In an embodiment, the second sorted order may be order of applications most frequently used during the vertical mode among a plurality of applications. Referring to FIG. 1B, the electronic apparatus 100 may display, at a first position, the 2-3 icon 20-3 corresponding to the third application which has been most frequently used during the vertical mode, and display a 2-5 icon 20-5 corresponding to a fifth application which has been second most frequently used, at a position adjacent to the 2-3 icon 20-3. Also, the electronic apparatus 100 may display the 2-4 icon 20-4 and the 2-1 icon 20-1 corresponding to a fourth application and a first application which have been third and fourth next frequently used in the vertical mode, at next positions. Here, the usage history for each of the plurality of applications may be identified according to an execution frequency or an execution duration of each of the plurality of applications.

In another embodiment, the second sorted order may be order of applications which have been most recently executed in the vertical mode among a plurality of applications. That is, in the vertical mode, the electronic apparatus 100 may sort and display a plurality of icons in order of icons corresponding to the most recently executed applications on the UI 20.

In another embodiment, the second sorted order may be a popularity order for a plurality of applications in the vertical mode. Specifically, the electronic apparatus 100 may receive usage history information for a plurality of applications in the vertical mode from an external server. The external server may receive usage history of each of the plurality of applications in the plurality of external devices in the vertical mode from the plurality of external devices and aggregate usage history information for each of the applications. Also, the electronic apparatus 100 may receive the usage history information for the plurality of applications generated in the external server and identify the second sorted order based on the received usage history information.

In addition, as an embodiment, the second sorted order include the 2-1 sorted order according to the frequency of use order for a plurality of applications in vertical mode and the 2-2 sorted order according the order of most recently executed applications in the vertical mode. That is, the electronic device 100 displays a plurality of icons arranged in the 2-1 sorted order in the first area of the UI 20, and displays the plurality of icons arranged in the 2-2 sorted order in the second area of the UI 20.

Through the embodiment described above, the electronic apparatus 100 may provide a user interface suitable for a display mode according to the display mode of the display, thereby providing a user with a more convenient user interface.

Figure 2:
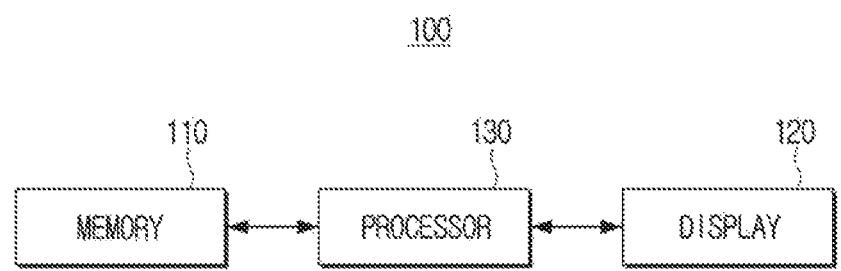
FIG. 2 is a block diagram illustrating a configuration of an electronic apparatus according to an embodiment of the disclosure.

FIG. 2 is a block diagram illustrating a configuration of an electronic apparatus according to an embodiment of the disclosure. Referring to FIG. 2, the electronic apparatus 100 according to an embodiment of the disclosure may include a memory 110, a display 120, and a processor 130.

Computer-readable instructions and programs may be stored in the memory 110. In addition, an operating system (O/S) for performing operations of the electronic apparatus 100 may be stored in the memory 110. Further, various software programs or applications for operating the electronic apparatus 100 may be stored in the memory 110 according to various embodiments of the disclosure. The memory 110 may include a semiconductor memory such as a flash memory or a magnetic storage medium such as a hard disk.

Various software modules for operating the electronic apparatus 100 may be stored in the memory 110 according to embodiments of the disclosure, and the processor 130 may control an operation of the electronic apparatus 100 by executing various software modules and accessing application data stored in the memory 110. That is, the memory 110 is accessed by the processor 130, and data reading, writing, modifying, deleting, and updating of data may be performed by the processor 130.

Meanwhile, in the disclosure, the term of memory 110 may be used as a meaning including the memory 110, a ROM or a RAM in the processor 130, or a memory card (e.g., micro SD card, memory stick) installed in the electronic apparatus 100.

In particular, in various embodiments according to the disclosure, usage history for a plurality of applications for each display mode may be stored in the memory 110. In addition, content received from an external device, such as a user terminal or a broadcast receiving device, may be stored in the memory 110. In addition, various information necessary within a scope for achieving the object of the disclosure may be stored in the memory 110, and the information stored in the memory 110 may be updated as data is received from a server or an external device or input by a user.

The display 120 may display various images. The image may include at least one of a still image or a video, and the display 120 may display various images of broadcast content and multimedia content. In addition, the display 120 may display various user interfaces (UIs) and icons.

According to an embodiment of the disclosure, the display 120 may operate in a display mode among the horizontal mode and the vertical mode.

As such, the display 120 may be realized as various types of displays such as a liquid crystal display (LCD), a light emitting diode (LED), an organic light emitting diode (OLED), liquid crystal on silicon (LCoS), digital light processing (DLP), and the like. In addition, the display 120 may also include a driving circuit which may be implemented in a form such as an a-Si TFT, a low temperature poly silicon (LTPS) TFT, or an organic TFT (OTFT), a backlight unit, and the like.

In addition, the display 120 may be realized as a touch screen in combination with a touch sensing unit.

The processor 130 controls an overall operation of the electronic apparatus 100. To this end, the processor 130 may include one or more of a central processing unit (CPU), an application processor (AP), or a communication processor (CP). The processor 130 may be realized in various ways. For example, the processor 130 may be realized as at least one of an application specific integrated circuit (ASIC), an embedded processor, a microprocessor, hardware control logic, a hardware finite state machine (FSM), and a digital signal processor (DSP). In the disclosure, the term of processor 130 may be used as including a central processing unit (CPU), a graphic processing unit (GPU), and a main processing unit (MPU).

The processor 130 may control execution of an operating system or an application program to control hardware or software components connected to the processor 130 and may perform various data processing and calculations. In addition, the processor 130 may load instructions or data received from at least one of other components into a volatile memory and process the loaded instructions or data and store various data in a non-volatile memory.

In an embodiment according to the disclosure, the processor 130 may gather usage history for a plurality of applications for each display mode. That is, the processor 130 tracks and stores in the memory 110 usage history for a plurality of applications when the display 120 operates in the horizontal mode and obtains usage history for a plurality of applications when the display 120 operates in the vertical mode.

Also, while the display 120 is operating in the horizontal mode, the processor 130 may control the display 120 to display a plurality of first icons corresponding to the plurality of applications in first sorted order.

In an embodiment according to the disclosure, when a user command for generating a UI is input while the display 120 is operating in the horizontal mode, the processor 130 may control the display 120 to display a plurality of first icons corresponding to the plurality of applications in first sorted order based on usage history for the plurality of applications in the horizontal mode. According to an embodiment of the disclosure, a user command for generating a UI may include a user command for displaying a home screen of the electronic apparatus 100 and a user command for displaying a plurality of application icons included in the electronic apparatus 100. In addition, the user command may include an input through an external device such as a remote controller, voice input through a user's voice, and a touch input through a touch screen of the display 120.

The plurality of first icons may be displayed based on a layout corresponding to the horizontal mode. In an embodiment, the plurality of first icons may be displayed as a layout in which a length of the horizontal is longer than that of a length of the vertical. In addition, each of the plurality of first icons may include at least one of a thumbnail corresponding to the plurality of icons, a name of the corresponding application, and a logo of the corresponding application.

In addition, the first sorted order may be an order of a plurality of applications which have been most frequently used during the horizontal mode or may be an order of the plurality of applications which have been most recently executed in the horizontal mode. Also, the processor 130 may receive usage history for a plurality of applications from an external server to identify the first sorted order.

When a user command for generating a UI is input while the display 120 is operating in the vertical mode, the processor 130 may control the display 120 to display a plurality of second icons corresponding to a plurality of applications in second sorted order based on usage history for the plurality of applications in the vertical mode. In addition, when the display mode is switched from the horizontal mode to the vertical mode, the processor 130 may control the display to display a plurality of second icons corresponding to the plurality of applications in second sorted order based on the usage history of the plurality of applications in the horizontal mode.

The plurality of second icons may be displayed based on a layout corresponding to the vertical mode. In an embodiment, the plurality of second icons may be displayed in a layout in which a length of the vertical dimension of the electronic apparatus 100 is longer than that of a length of the horizontal dimension of the electronic apparatus 100. In addition, each of the plurality of second icons may include at least one of a thumbnail corresponding to the plurality of icons, a name of the corresponding application, and a logo of the corresponding application.

In addition, the second sorted order may be an order of the plurality of applications which have been most frequently used during the vertical mode or may be an order of the plurality of applications which have been most recently executed in the vertical mode. Also, the processor 130 may receive usage history for a plurality of applications from an external server to identify the second sorted order.

According to an embodiment of the disclosure, the processor 130 may identify a display mode corresponding to each of a plurality of contents included in a first application among the plurality of applications. In an embodiment, the plurality of contents may be at least one of an image, a picture, a file, an executed file, an external device, and a document. That is, the processor 130 may identify whether each of the plurality of contents is suitable for the vertical mode or the horizontal mode, and identify a display mode corresponding to each of the plurality of contents.

When the first application is executed in the horizontal mode, the processor 130 may control the display 120 to display at least one content corresponding to the horizontal mode among a plurality of contents. In an embodiment, when the first application is executed in the horizontal mode, the processor 130 may display at least one content corresponding to the horizontal mode among the plurality of contents and may not display at least one content corresponding to the vertical mode among the plurality of contents. In another embodiment, when the first application is executed in the horizontal mode, the processor 130 may control the display 120 to sort and display at least one content corresponding to the horizontal mode among the plurality of contents as a highest priority and to sort and display at least one content corresponding to the vertical mode as secondary priority.

When the first application is executed in the vertical mode, the processor 130 may control the display 120 to display at least one content corresponding to the vertical mode among the plurality of contents. In addition, when the display mode is switched from the horizontal mode to the vertical mode while the first application screen is being executed in the horizontal mode, the processor 130 may control the display 120 to display at least one content corresponding to the vertical mode among the plurality of contents.

In an embodiment, when the first application is executed in the vertical mode, the processor 130 displays at least one content corresponding to the vertical mode among the plurality of contents and may not display at least one content corresponding to the horizontal mode among the plurality of contents. As another example embodiment, when the first application is executed in the vertical mode, the processor 130 may control the display 120 to sort and display at least one content corresponding to the vertical mode among the plurality of contents as a highest priority and to sort and display at least one content corresponding to the horizontal mode among the plurality of contents as a secondary priority. An embodiment in which a plurality of contents are sorted and displayed according to a display mode of the display 120 will be described with reference to FIGS. 4A, 4B, 5A, 5B, 6A, and 6B below.

In an embodiment according to the disclosure, when a user command for selecting content for the vertical mode is input while the display 120 is operating in the horizontal mode, the processor 130 may control the display 120 to display a guide UI that guides the user to switch the display mode to the vertical mode. Also, in case that the electronic device 100 further includes a motor for rotating the display 120, when a user command for switching the display mode is input through the guide UI, the processor 130 may control the motor and the display 120 to operate in the vertical mode. Also, when a user command for selecting content in the horizontal mode is input while the display 120 is operating in the vertical mode, the processor 130 may control the display 120 to display the guide UI inquiring about whether to switch the display mode to the horizontal mode. The guide UI will be described with reference to FIGS. 7A, 7B, 7C, 8A, and 8B below.

Through various embodiments described above, the electronic apparatus 100 may provide content suitable for the display mode according to the display mode of the display, thereby improving user convenience.

Figure 3A:
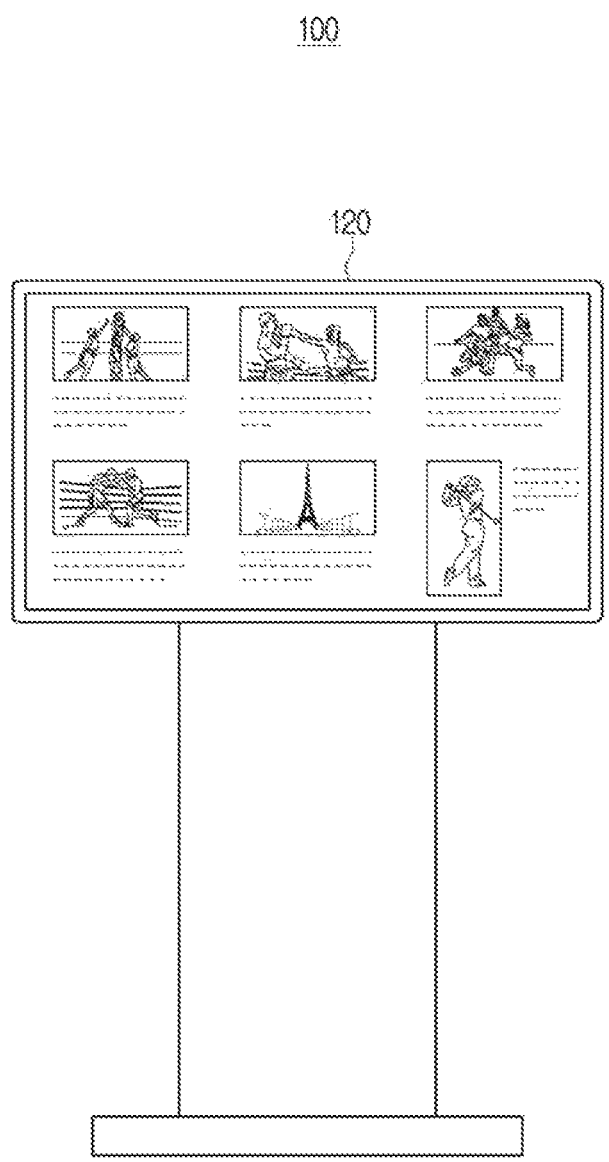
FIG. 3A is a diagram illustrating a method of providing content in a horizontal mode according to an embodiment of the disclosure.
Figure 3B:
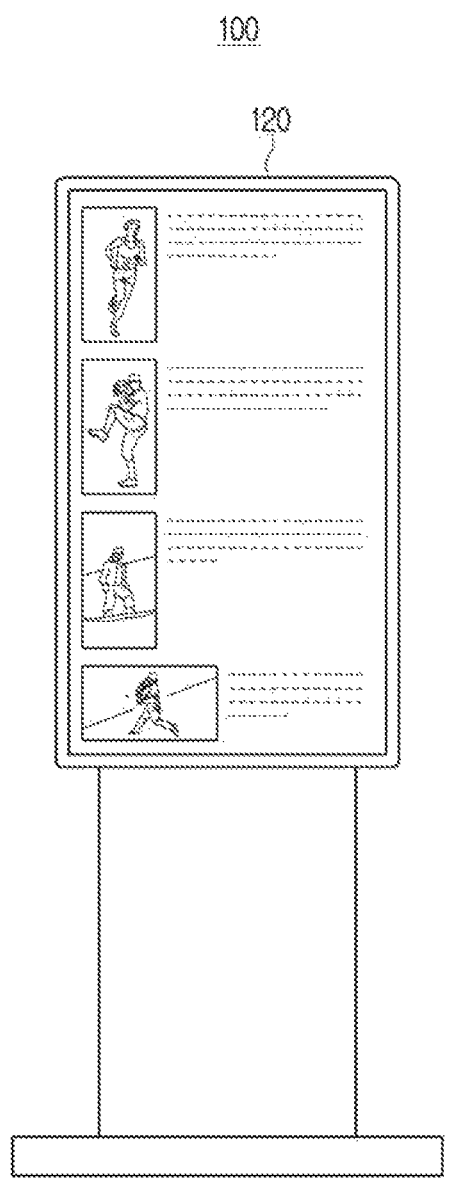
FIG. 3B is a diagram illustrating a method of providing content in a vertical mode according to an embodiment of the disclosure.

FIG. 3A is a view illustrating a method of providing content in the horizontal mode according to an embodiment of the disclosure, and FIG. 3B is a view illustrating a method of providing content in the vertical mode according to an embodiment of the disclosure.

Referring to FIG. 3A, while operated in the horizontal mode, the electronic apparatus 100 may preferentially sort and display contents corresponding to the horizontal mode among a plurality of contents on the display 120. For example, the content corresponding to the horizontal mode may include pictures, documents, and images having an aspect ratio in which a length of a width dimension thereof is longer than a vertical dimension thereof. In addition, as illustrated in FIG. 3A, text related to the corresponding content may be further displayed below the content corresponding to the horizontal mode.

Also, referring to FIG. 3B, while operated in the vertical mode, the electronic apparatus 100 may preferentially sort and display contents corresponding to the vertical mode among a plurality of contents on the display 120. For example, the content corresponding to the vertical mode may include pictures, documents, and images having an aspect ratio in which a length of a vertical dimension thereof is longer than a width dimension thereof. In addition, as illustrated in FIG. 3B, text related to the content may be further displayed on the right of the content corresponding to the vertical mode.

Specifically, the electronic apparatus 100 may identify a display mode corresponding to each of a plurality of contents. Specifically, the electronic apparatus 100 may identify a display mode corresponding to each content based on information included in the content. As an embodiment, when a plurality of contents are at least one of a picture, a document, and an image, the electronic apparatus 100 may identify an aspect ratio of the corresponding content and identify a display mode corresponding to each content. For example, when a horizontal to vertical aspect ratio of a first content among the plurality of content is 16:9, a display mode corresponding to the corresponding content may be identified as the horizontal mode. In addition, when the horizontal to vertical aspect ratio of the second content among the plurality of content is 9:16, a display mode corresponding to the content may be identified as the vertical mode.

In the above description, it is described that the display mode corresponding to the content is identified according to the aspect ratio of the content, but the disclosure is not limited thereto and a display mode corresponding to content may be identified by various methods capable of identifying the display mode.

Also, when a user command for displaying a plurality of contents is input while operating in the horizontal mode, the electronic apparatus 100 may display a plurality of contents corresponding to the horizontal mode on the display 120 as shown in FIG. 3A. In an embodiment, the electronic apparatus 100 may display only the plurality of contents corresponding to the horizontal mode on the display 120 but is not limited thereto. That is, as illustrated in FIG. 3A, the electronic apparatus 100 may display the plurality of contents corresponding to the horizontal mode as a highest priority and display at least one content corresponding to the vertical mode as a secondary priority.

Also, when the display mode is switched from the horizontal mode to the vertical mode, a plurality of contents corresponding to the vertical mode may be displayed on the display 120. That is, when the display mode is switched to the vertical mode, the electronic apparatus 100 may display the plurality of contents corresponding to the vertical mode as shown in FIG. 3B instead of the plurality of contents corresponding to the horizontal mode of FIG. 3A on the display 120. In an embodiment, the electronic apparatus 100 may display only the plurality of contents corresponding to the vertical mode on the display 120 but is not limited thereto. That is, as illustrated in FIG. 3B, the electronic apparatus 100 may display the plurality of contents corresponding to the vertical mode as a highest priority and display at least one content corresponding to the horizontal mode as a secondary priority.

Through the embodiment described above, the electronic apparatus 100 may provide content suitable for the display mode according to the display mode of the display, thereby providing a user convenience function.

Figure 4A:
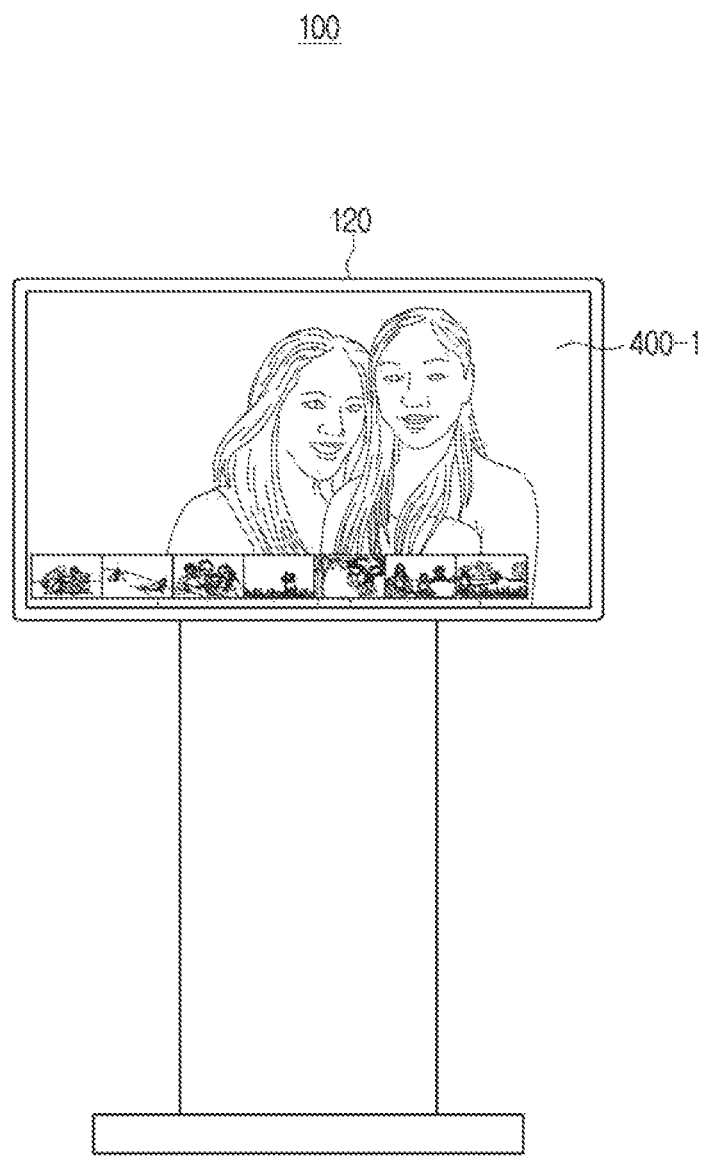
FIG. 4A is a diagram illustrating a method of providing an image in a horizontal mode according to an embodiment of the disclosure.
Figure 4B:
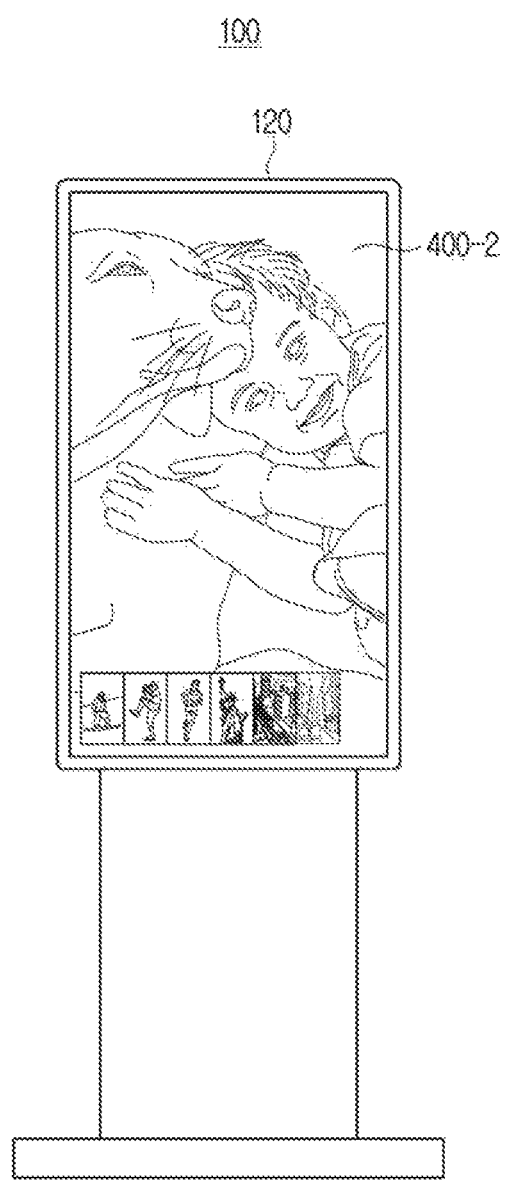
FIG. 4B is a diagram illustrating a method of providing an image in a vertical mode according to an embodiment of the disclosure.

FIG. 4A is a view illustrating a method of providing an image according to a horizontal mode according to an embodiment of the disclosure, and FIG. 4B is a view illustrating a method of providing an image according to a vertical mode according to an embodiment of the disclosure.

When a user command for displaying an image in the horizontal mode is input, the electronic apparatus 100 may display a first image 400-1 among images corresponding to the horizontal mode on the a portion of or the entire display 120 and display a plurality of images corresponding to the horizontal mode except for the first image 400-1 in an overlapping manner at one end of the first image 400-1 with a size smaller than that of the first image 400-1 as shown in FIG. 4A.

In an embodiment, the image corresponding to the horizontal mode may be an image suitable for display in the horizontal mode. For example, an image in which a length of a horizontal is longer than that of a vertical may be an image corresponding to the horizontal mode.

In FIG. 4A, only the plurality of images corresponding to the horizontal mode are displayed on the display 120 when in the horizontal mode, but the disclosure is not limited thereto. That is, when in the horizontal mode, the electronic apparatus 100 may display a plurality of images corresponding to the horizontal mode on the display 120 as a highest priority and display a plurality of images corresponding to the vertical mode as a secondary priority.

Also, when a user command for displaying an image in the vertical mode is input, the electronic apparatus 100 may display a second image 400-2 among images corresponding to the vertical mode on a portion of or the entire display 120 and a plurality of images corresponding to the vertical mode except the second image 400-2 in an overlapping manner at one end of the second image 400-2 with a size smaller than that of the second image 400-2 as shown in FIG. 4B.

In an embodiment, the image corresponding to the vertical mode may be an image suitable for display in the vertical mode. For example, an image in which a length of a vertical is longer than that of a horizontal may be an image corresponding to the vertical mode.

In FIG. 4B, only a plurality of images corresponding to the vertical mode are displayed on the display 120 when in the vertical mode, but the disclosure is not limited thereto. That is, when in the vertical mode, the electronic apparatus 100 may display a plurality of images corresponding to the vertical mode on the display 120 as a highest priority and display the plurality of images corresponding to the horizontal mode as a secondary priority.

In addition, while a plurality of images corresponding to the horizontal mode are displayed in the horizontal mode on the display 120 as shown in FIG. 4A, if the display mode is switched from the horizontal mode to the vertical mode, the electronic apparatus 100 may display a plurality of images corresponding to the vertical mode on the display 120 as shown in FIG. 4. That is, when the display mode is switched from the horizontal mode to the vertical mode, the electronic apparatus 100 may display a plurality of images corresponding to the vertical mode on the display 120 as shown in FIG. 4B, instead of the plurality of images corresponding to the existing horizontal mode of FIG. 4A.

Figure 5A:
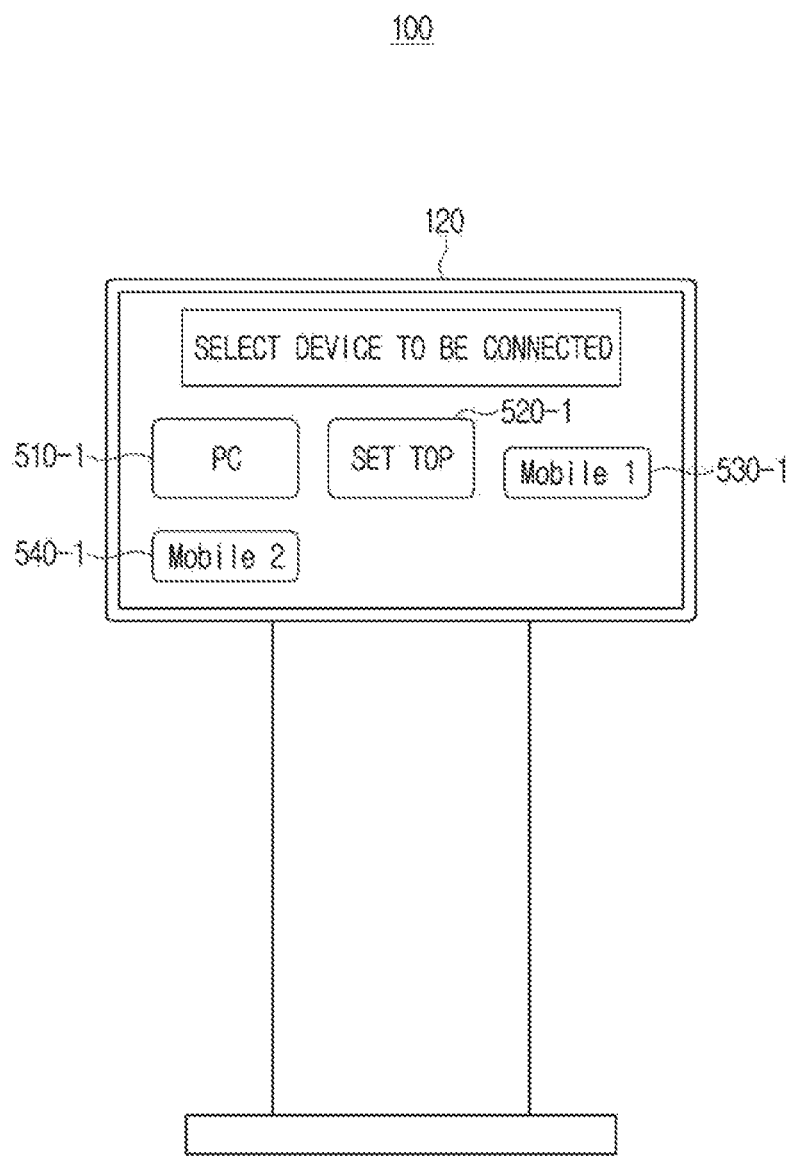
FIG. 5A is a diagram illustrating a user interface (UI) for connecting with a plurality of external devices in a horizontal mode according to an embodiment of the disclosure.
Figure 5B:
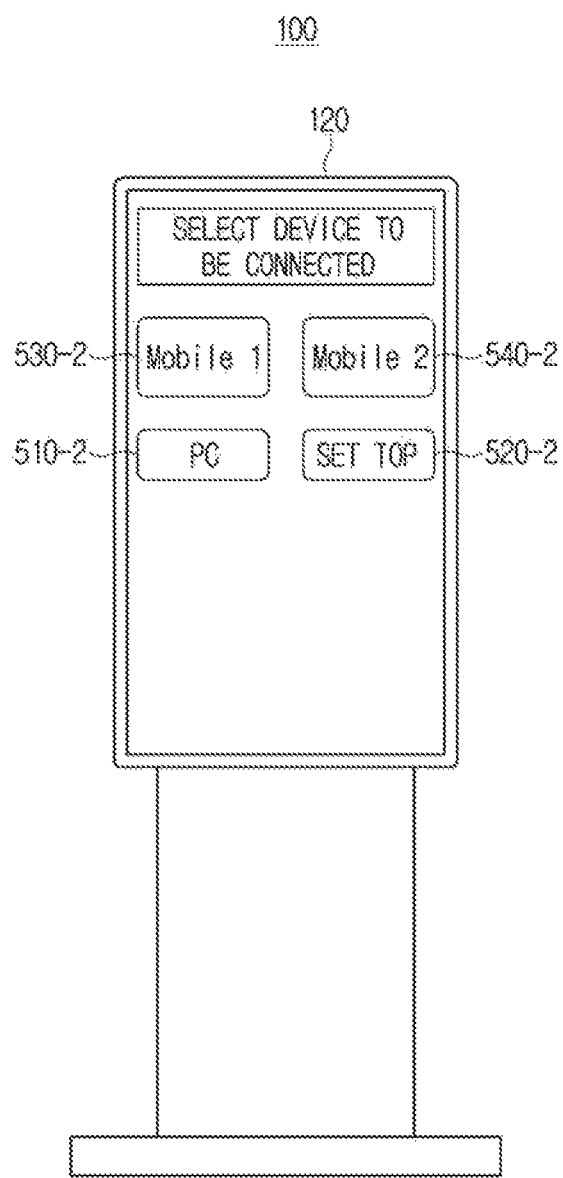
FIG. 5B is a diagram illustrating a user interface (UI) for connecting with a plurality of external devices in a vertical mode according to an embodiment of the disclosure.

FIG. 5A is a view illustrating a UI for connection to a plurality of external devices according to a horizontal mode according to an embodiment of the disclosure, and FIG. 5B is a view illustrating a UI for connection to a plurality of external devices according to a vertical mode according to an embodiment of the disclosure.

When a user command for displaying a UI for selecting an external device is input in the horizontal mode, the electronic apparatus 100 may sort and display a plurality of icons 510-1 and 520-1 for a plurality of external devices corresponding to the horizontal mode as top priority over a plurality of icons 530-1 and 540-1 for a plurality of external devices corresponding to the vertical mode as shown in FIG. 5A.

In an embodiment, in the horizontal mode, the electronic apparatus 100 may display the plurality of icons 510-1 and 520-1 for a plurality of external devices corresponding to the horizontal mode with a size larger than that of the plurality of icons 530-1 and 540-1 for a plurality of external devices corresponding to the vertical mode.

In an embodiment, the external device corresponding to the horizontal mode may be an external device suitable for a source provided by a corresponding external device to be displayed in the horizontal mode. For example, the PC, set-top box, TV, and the like may be an external device corresponding to the horizontal mode.

In FIG. 5A, the plurality of icons 510-1 and 520-1 for a plurality of external devices corresponding to the horizontal mode are sort and displayed as top priority over the plurality of icons 530-1 and 540-1 for a plurality of external devices corresponding to the vertical mode, but the disclosure is not limited thereto. That is, when a user command for displaying a UI for selecting an external device in the horizontal mode is input, the electronic apparatus 100 may display only the plurality of icons 510-1 and 520-1 for a plurality of external devices corresponding to the horizontal mode on the display 120.

When a user command for displaying a UI for selecting an external device in vertical mode is input, the electronic apparatus 100 may sort and display a plurality of icons 530-2 and 540-2 for a plurality of external devices corresponding to the vertical mode as top priority over a plurality of icons 510-2 and 520-2 for a plurality of external devices corresponding to the horizontal mode as shown in FIG. 5B.

In an embodiment, in the vertical mode, the electronic apparatus 100 may display the plurality of icons 530-2 and 540-2 for a plurality of external devices corresponding to the vertical mode with a size larger than that of the plurality of icons 510-2 and 520-2 for a plurality of external devices corresponding to the horizontal mode.

In an embodiment, the external device corresponding to the vertical mode may be an external device suitable for a source provided by the external device to be displayed in the vertical mode. For example, a mobile device, a tablet PC, or the like may be an external device corresponding to the vertical mode.

In FIG. 5B, the plurality of icons 530-2 and 540-2 for a plurality of external devices corresponding to the vertical mode are displayed as top priority over the plurality of icons 510-2 and 520-2 for a plurality of external devices corresponding to the horizontal mode, but the disclosure is not limited thereto. That is, when a user command for displaying a UI for selecting an external device in the vertical mode is input, the electronic apparatus 100 may display only the plurality of icons 530-2 and 540-2 for a plurality of external devices corresponding to the vertical mode on the display 120.

Figure 6A:
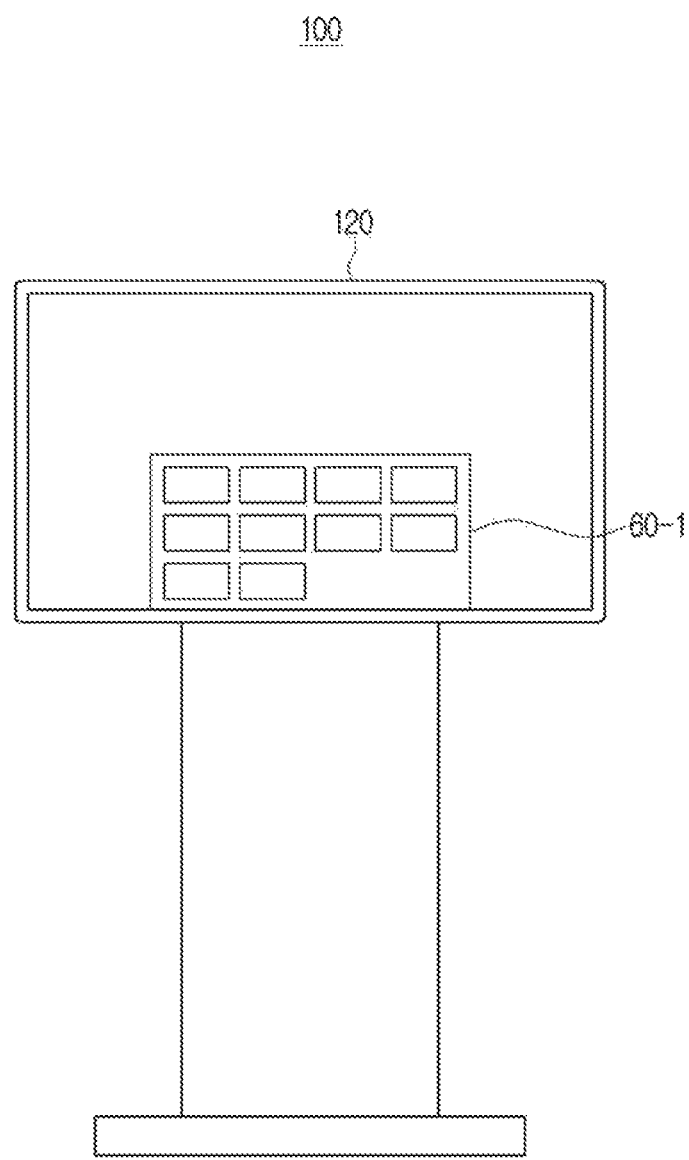
FIG. 6A is a diagram illustrating a method of providing a document file in a horizontal mode according to an embodiment of the disclosure.
Figure 6B:
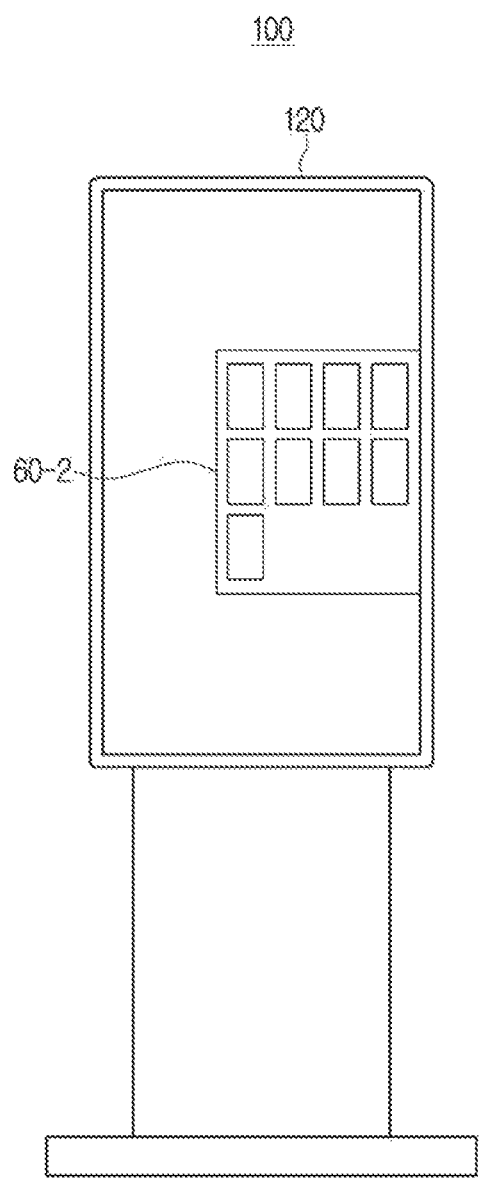
FIG. 6B is a diagram illustrating a method of providing a document file in a vertical mode according to an embodiment of the disclosure.

FIG. 6A is a view illustrating a method for providing a document file according to a horizontal mode according to an embodiment of the disclosure, and FIG. 6B is a view illustrating a method for providing a document file according to an vertical mode according to an embodiment of the disclosure.

Referring to FIG. 6A, when a user command for displaying a plurality of document files is input while the display 120 operates in the horizontal mode, the electronic apparatus 100 may display a plurality of document files corresponding to the horizontal mode, among a plurality of document files, on a region 60-1 of the display 120. In an embodiment, the user command for displaying the plurality of document files may be an application execution command for displaying the plurality of document files.

The document file according to the disclosure may be a file that may be executed by a document editing application such as a text file, a spread sheet file, or a word file, and an interactive white board (IWB) file created by an electronic blackboard application. Also, the document file corresponding to the horizontal mode may be a document file having an aspect ratio in which a length of a width is longer than that of a length of a vertical and may be a document file suitable for display in the horizontal mode.

In FIG. 6A, it is illustrated that, while the display 120 operates in the horizontal mode, only a plurality of document files corresponding to the horizontal mode is displayed, but the disclosure is not limited thereto. In an embodiment, the electronic apparatus 100 may sort the document files corresponding to the horizontal mode among a plurality of document files as top priority and sort document files corresponding to the vertical mode among the plurality of document files as next priority, and display the document files in the region 60-1 of the display 120.

Referring to FIG. 6B, when a user command for displaying a plurality of document files is input while the display 120 operates in the vertical mode, the electronic apparatus 100 may display the plurality of document files corresponding to the vertical mode, among a plurality of document files, in a region 60-2 of the display 120. The document file corresponding to the vertical mode may be a document file having an aspect ratio in which a length of vertical is longer than that of a length of width and may be a document file suitable for display in the vertical mode.

In FIG. 6B, it is illustrated that, while the display 120 operates in the vertical mode, only a plurality of document files corresponding to the vertical mode is displayed, but the disclosure is not limited thereto. In an embodiment, the electronic apparatus 100 may sort the document files corresponding to the vertical mode among a plurality of document files as top priority and sort document files corresponding to the horizontal mode among the plurality of document files as next priority, and display the document files in the region 60-2 of the display 120.

In an embodiment of the disclosure, while a plurality of documents are displayed as shown in FIG. 6A while the display 120 operates in the horizontal mode, if the display mode is switched from the horizontal mode to the vertical mode, the electronic apparatus may display a plurality of document files corresponding to the vertical mode among the plurality of document files on the region 60-2 of the display 120 as shown in FIG. 6B.

Figure 7A:
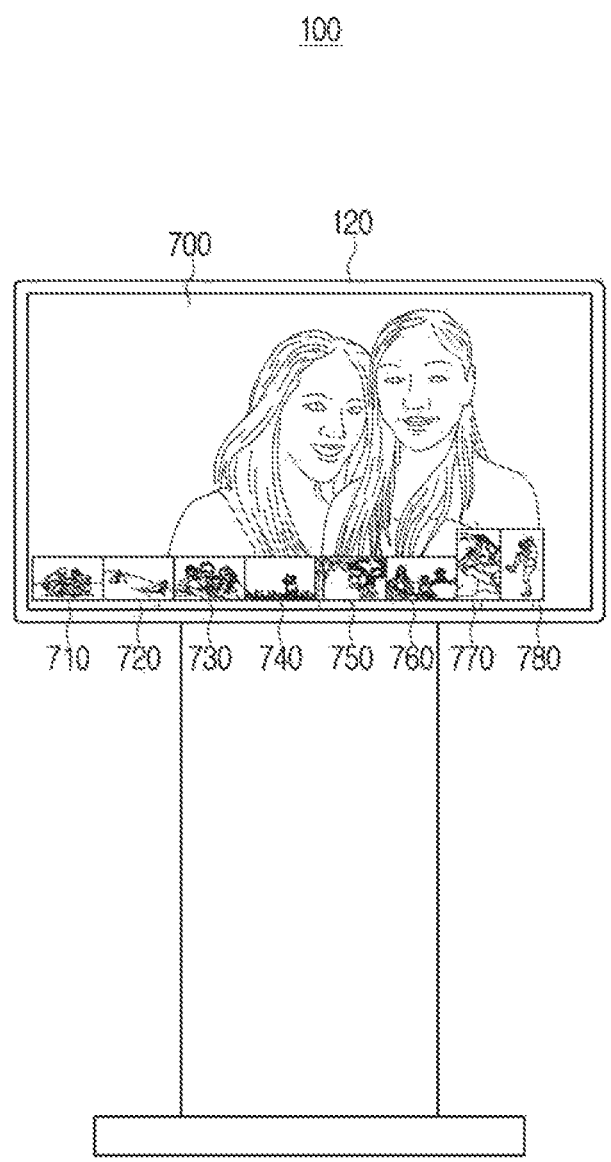
FIG. 7A is a diagram illustrating a screen displaying a plurality of images while operating in a horizontal mode according to an embodiment of the disclosure.
Figure 7B:
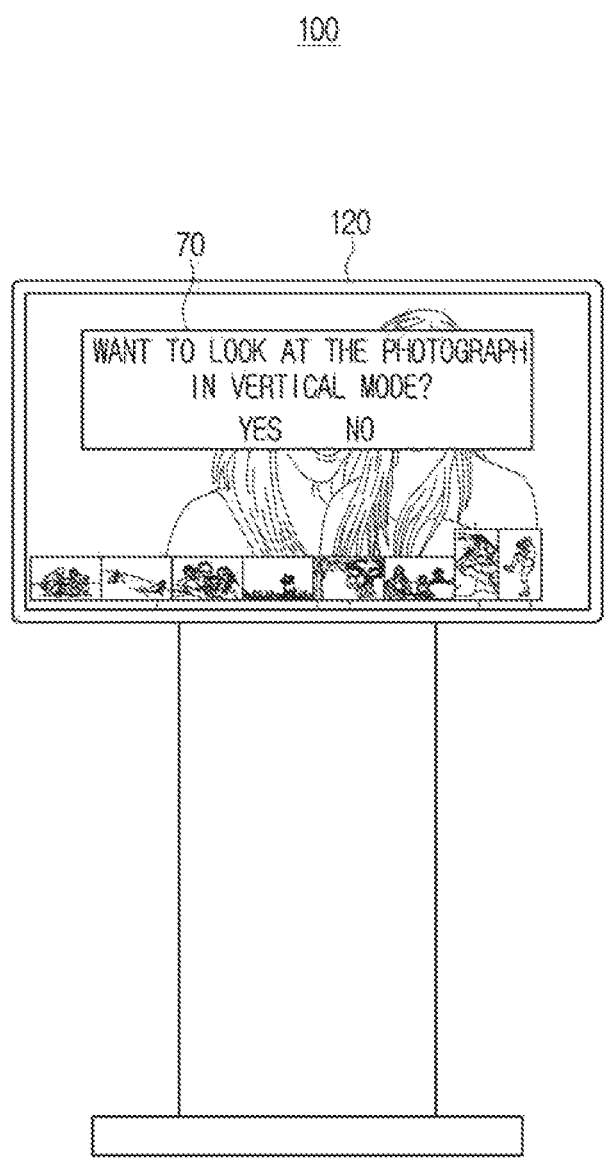
FIG. 7B is a diagram illustrating a guide user interface (UI) for switching a display mode according to an embodiment of the according to an embodiment of the disclosure.
Figure 7C:
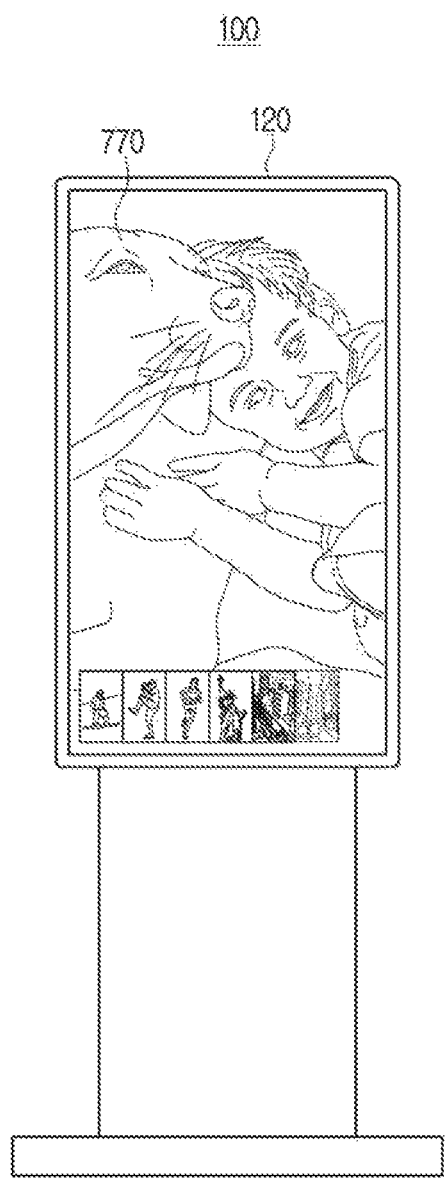
FIG. 7C is a diagram illustrating a screen switched to a vertical mode according to a guide user interface (UI) according to an embodiment of the disclosure.

FIG. 7A is a view showing a screen displaying a plurality of images while operating in the horizontal mode according to an embodiment of the disclosure. FIG. 7B is a view illustrating a guide UI for switching a display mode according to an embodiment of the disclosure. FIG. 7C is a view illustrating a screen switched to the vertical mode according to a guide UI.

The electronic apparatus 100 may display a plurality of images 700 to 780 on the display 120. Specifically, as shown in FIG. 7A, the electronic apparatus 100 may display a first image 700 among the plurality of images 700 to 780 on the entire region of the display 120 and display the images 710 to 780 at a lower end region of the display 120. For example, the image 710 to 780 may be displayed as thumbnails overlaid over a bottom portion of the first image 700. In addition, while operating in the horizontal mode as shown in FIG. 7A, the electronic apparatus 100 may sort and display the plurality of images 710 to 760 corresponding to the horizontal mode as top priority and sort and display a plurality of images 770 and 780 corresponding to the vertical mode a secondary priority. That is, the images 710 to 780 may be displayed in an order in which images 710 to 760 are prioritized over images 778 and 780.

Also, when a user command for selecting the seventh image 770 among the plurality of images 770 and 780 corresponding to the vertical mode is input, while being displayed as shown in FIG. 7A, the electronic apparatus 100 may display a guide UI 70 inquiring whether to change the display mode to the vertical mode on a region of the display 120 as shown in FIG. 7B. The guide UI 70 according to the disclosure is a UI for switching to a different display mode when a user command for selecting content corresponding to a display mode different from the current display mode is input. That is, when the seventh image 770 or the eighth image 780 corresponding to the vertical mode is selected, while being displayed in the horizontal mode as shown in FIG. 7A, the guide UI 70 according to the disclosure may be displayed.

Also, when a user command for switching the display mode to the vertical mode is input through the guide UI 70 of FIG. 7B, the electronic apparatus 100 may control the display 120 to operate in the vertical mode. In an embodiment, the electronic apparatus 100 may further include a motor for rotating the display 120, and the display 120 may be rotated by the motor. However, when a user command for maintaining the display mode as the horizontal mode is input, the electronic apparatus 100 may maintain the horizontal mode and display the seventh image 770 corresponding to the vertical mode on the display 120. In this case, because the seventh image 770 corresponding to the vertical mode has an aspect ratio in which length is longer than width, the seventh image 770 may not be displayed on the entire region of the display 120 and may be displayed in a portion of the display 120.

Also, when the display 120 is switched to the vertical mode through the guide UI 70, the electronic apparatus 100 may display the seventh image 770 on the entire region of the display 120 and display the other plurality of small images at a lower end region of the display 120. Also, while operating in the vertical mode as shown in FIG. 7C, the electronic apparatus 100 may display a plurality of small images corresponding to the vertical mode on the lower end region of the display 120.

In FIG. 7C, only a plurality of images corresponding to the vertical mode are displayed to be small at a lower end region of the display 120, but are not limited thereto. That is, the electronic apparatus 100 may sort and display a plurality of images corresponding to the vertical mode as top priority and sort and display the plurality of images 700 to 760 corresponding to the horizontal mode in a lower end region of the display 120 as next priority.

Figure 8A:
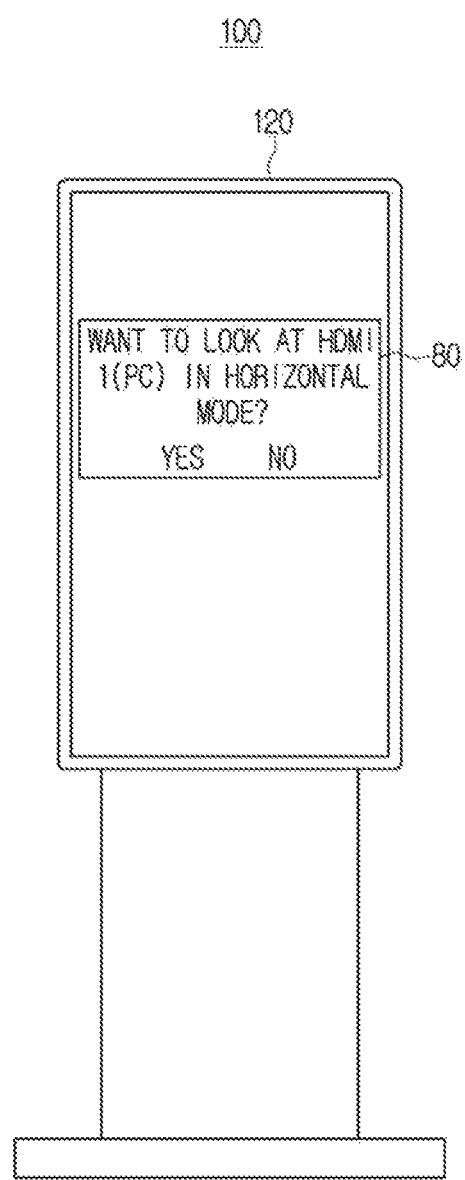
FIG. 8A is a diagram illustrating a guide UI for switching a display mode according to an embodiment of the disclosure.
Figure 8B:
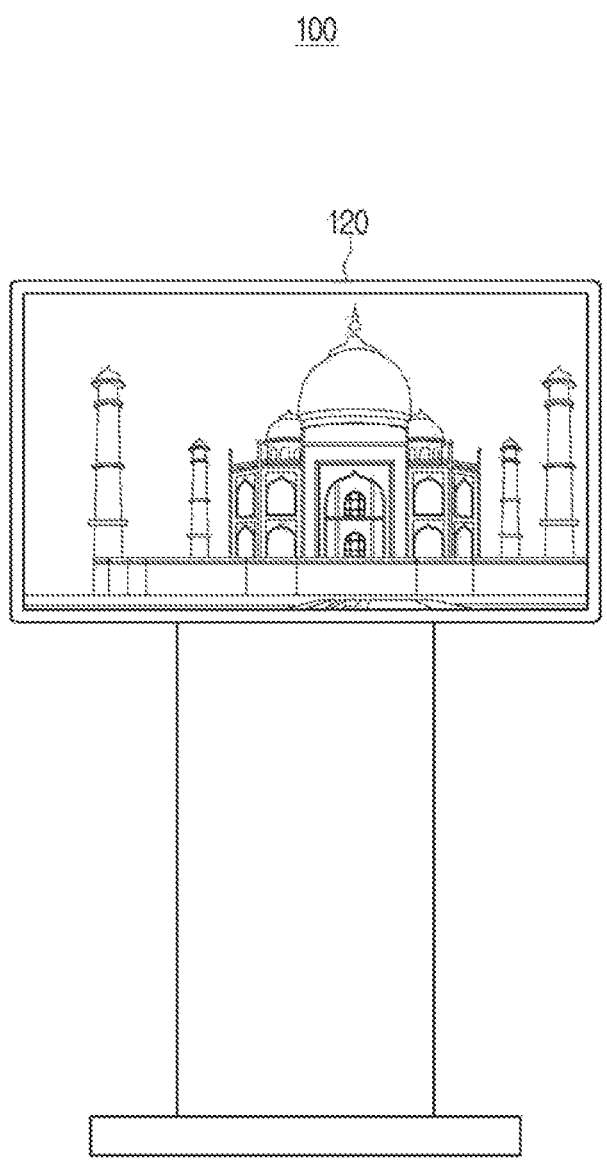
FIG. 8B is a diagram illustrating a change in a display mode of a display according to a guide user interface (UI); according to an embodiment of the disclosure.

FIG. 8A is a view illustrating a guide UI for switching a display mode. FIG. 8B is a diagram illustrating that a display mode of the display is switched according to the guide UI.

According to an embodiment of the disclosure, in a state that the electronic apparatus 100 operates in the vertical mode, when the external device (PC) is connected through a high definition multimedia interface 1 (HDMI1) terminal, the electronic apparatus 100 may display a guide UI 80 asking whether to switch the display mode to the horizontal mode.

In an embodiment, when the electronic apparatus 100 is connected to an external device through the HDMI terminal, the electronic apparatus 100 may receive information on the external device through the HDMI terminal. Also, the electronic apparatus 100 may identify a display mode corresponding to the external device through the received information on the external device. In an embodiment, a PC may be identified as an external device corresponding to the horizontal mode.

Also, when a user command for switching the display mode to the horizontal mode is input through the guide UI 80, the electronic apparatus 100 may control the display 120 to operate in the horizontal mode. In an embodiment, the electronic apparatus 100 may further include a motor for rotating the display 120, and the display 120 may be rotated by the motor. However, when a user command for maintaining the display mode in the vertical mode is input, an image provided from the external device PC may be displayed on the display 120 in the vertical mode.

Also, when the display 120 is switched to the horizontal mode through the guide UI 80, the electronic apparatus 100 may display the image provided from the external device (PC) in the horizontal mode on the display 120 as shown in FIG. 8B.

Figure 9:
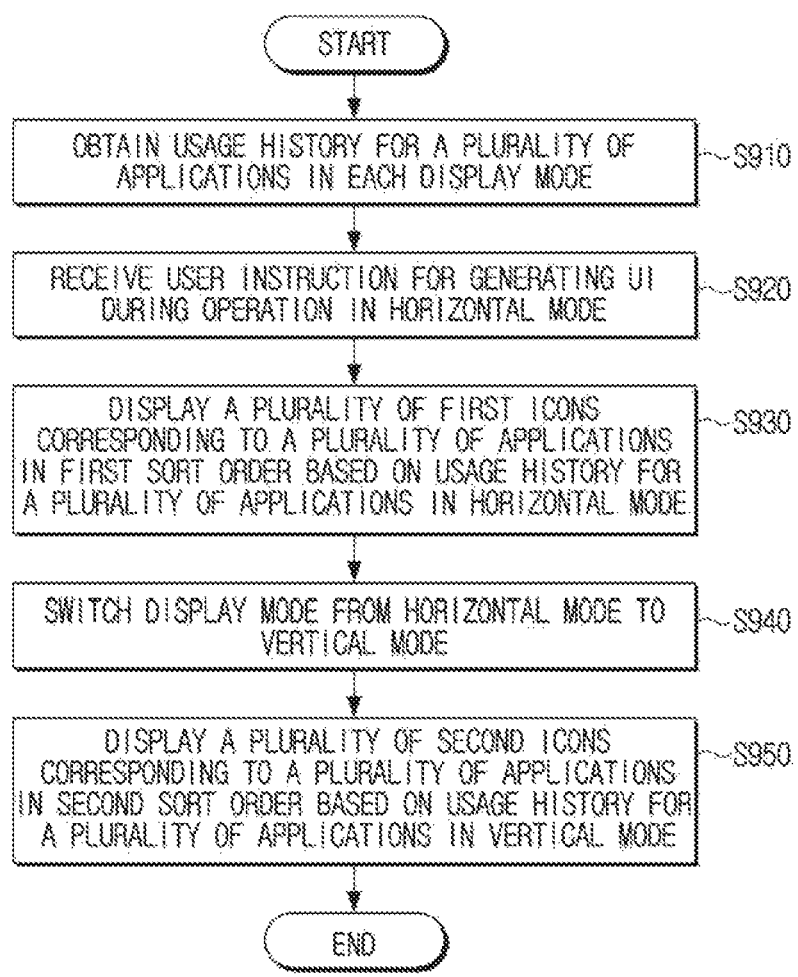
FIG. 9 is a diagram illustrating a method of controlling an electronic apparatus according to an embodiment of the disclosure.

FIG. 9 is a view illustrating a control method of an electronic apparatus according to an embodiment of the disclosure.

The electronic apparatus 100 may obtain usage history for a plurality of applications for each display mode (S910). As an embodiment, the electronic apparatus 100 may acquire usage history of a plurality of applications in the horizontal mode and usage history of a plurality of applications in the vertical mode. As an embodiment, the usage history of a plurality of applications may include information on history of a plurality of recently executed applications and information on the frequency with which the various applications have been executed.

Also, the electronic apparatus 100 may receive a user command for displaying a UI, while operating in horizontal mode (S920). The UI according to the disclosure may be a UI for providing a recommended application to the user when the display 120 is in the horizontal mode. In addition, a user command for creating the UI may include an input through an external device such as a remote controller, a voice input through a user's voice, a touch input through a touch screen of the display 120, and the like.

When a user command for providing a UI is input, the electronic apparatus 100 may display a plurality of first icons corresponding to a plurality of applications based on the usage history of the plurality of applications in the horizontal mode in a first sorted order (S930). The plurality of first icons may be displayed based on a layout corresponding to the horizontal mode, and in an embodiment, the plurality of first icons may be displayed with a layout in which the horizontal is longer than the vertical. Each of the plurality of first icons may include at least one of thumbnails corresponding to the plurality of icons, names of the corresponding applications, and logos of the corresponding applications. The first sorted order may be an order of applications which have been most frequently used among a plurality of applications in the horizontal mode or may be an order of applications which have been most recently executed in the horizontal mode among a plurality of applications.

When the display mode is switched from the horizontal mode to the vertical mode (S940), the electronic apparatus 100 may display a plurality of second icons corresponding to a plurality of applications in a second sorted order based on usage history of the plurality of applications in the vertical mode (S950). The plurality of second icons may be displayed based on a layout corresponding to the vertical mode. In an embodiment, the plurality of second icons may be displayed with a layout in which a length of the vertical dimension thereof is longer than a length of the horizontal dimension thereof. Each of the plurality of second icons may include at least one of thumbnails corresponding to the plurality of icons, names of the corresponding applications, and logos of the corresponding applications. The second sorted order may be an order of applications which have been most frequently used among a plurality of applications in the vertical mode or may be order of applications which have been most recently executed in the vertical mode among a plurality of applications.

Figure 10:
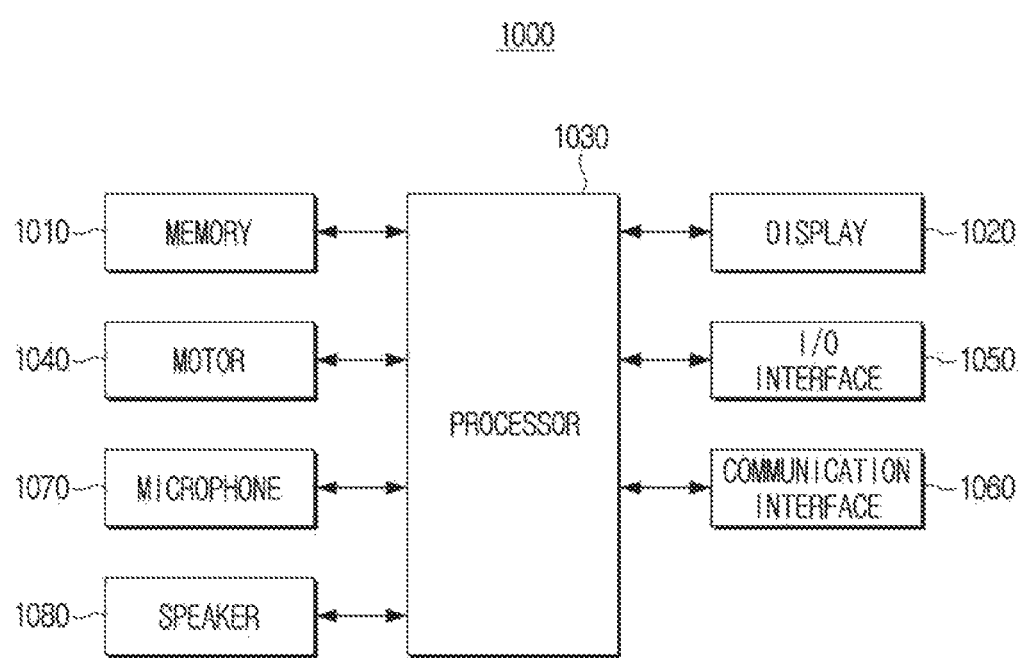
FIG. 10 is a block diagram illustrating a specific configuration of an electronic apparatus according to the disclosure.

FIG. 10 is a block diagram illustrating a specific configuration of an electronic apparatus 1000 according to the disclosure.

As shown in FIG. 10, the electronic apparatus 1000 according to an embodiment of the disclosure may further include a motor 1040, an input/output (I/O) interface 1050, a communication interface 1060, a microphone 1070, and a speaker 1080, as well as a memory 1010, a display 1020, and a processor 1030. However, these components are merely an example, and in practicing the disclosure, a new component may be added in addition to the configuration or some components may be omitted. The memory 1010, the display 1020, and the processor 1030 have been described with reference to FIG. 2, and thus, the motor 1040, the I/O interface 1050, the communication interface 1060, the microphone 1070, the speaker 1080, and the like will be described below.

The motor 1040 may rotate the display 1020. Specifically, the motor 1040 may be connected to a gear (e.g., a circular gear) coupled with the display 1020 and may rotate the display 1020 by rotating the gear under the control of the processor 1030. Alternatively, the motor 1040 may stop the rotation of the display 1020 by stopping the rotation of the gear under the control of the processor 1030.

To this end, the motor 1040 may be realized as a step motor capable of generating a rotational force, but this is merely an example, and the motor 1040 may be realized as various motors such as an AC motor and a DC motor.

When the electronic apparatus 1000 includes the motor 1040, the display 1020 may be rotated according to driving of the motor 1040. That is, when an event for switching the display mode of the display 1020 is detected, the processor 1030 may control the motor 1040 to rotate the display 1020. In an embodiment, the event for switching the display mode may be a user input for switching the display mode of the display 1020, but is not limited thereto. That is, the event for switching the display mode may include an event in which an application is selected, an event connected to an external device, a user input applied from an external remote control device, and the like, and may include various other events for switching the display mode of the display 1020. Also, various events for switching the display mode may be set by the user.

Here, the display 1020 may be rotated around a rotation center, with a front side thereof maintained in a constant direction. Here, the rotation center may be located at a geometric center of the display 1020, but is not limited thereto, and may be located at another position of the display 1020.

The I/O interface 1050 may be an interface or input and output of at least one of audio and video signals. In particular, the I/O interface 1050 may receive an image from an external device capable of providing an image to the display 1020.

Meanwhile, the I/O interface 1050 may be an HDMI, but this is merely an example, and may be an interface of one of a mobile high-definition link (MHL), universal serial bus (USB), display port (DP), thunderbolt, video graphics array (VGA) port, RGB port, D-subminiature (D-SUB), and digital visual interface (DVI). Depending on embodiment, the I/O interface 1050 may include a port for inputting and outputting only an audio signal and a port for inputting and outputting only a video signal as separate ports or may be configured as a single port for inputting and outputting both audio and video signals.

The communication interface 1060 is a component that performs communication with various types of external devices according to various types of communication methods. The communication interface 1060 may include a Wi-Fi chip, a Bluetooth chip, a wireless communication chip, and a near-field communication (NFC) chip. The processor 1030 may communicate with various external devices using the communication interface 1060.

In an embodiment according to the disclosure, the processor 1030 may perform wireless connection with an Internet of Things (IoT) device connectable with the electronic apparatus 1000 through the communication interface 1060. In particular, a Wi-Fi chip and a Bluetooth chip may perform communication using a Wi-Fi method and a Bluetooth method, respectively. In case of using the Wi-Fi chip or the Bluetooth chip, various connection information such as an SSID, a session key, and the like may be first transmitted and received to establish connection for communication and then various information may be transmitted and received. The wireless communication chip refers to a chip that performs communication according to various communication standards such as IEEE, Zigbee, 3rd generation (3G), 3rd generation partnership project (3GPP), and long term evolution (LTE). The NFC chip refers to a chip that operates in an NFC method using a 13.56 MHz band among various RF-ID frequency bands such as 135 kHz, 13.56 MHz, 433 MHz, 860 to 960 MHz, and 2.45 GHz.

That is, in an embodiment, the processor 1030 may perform connection with an external device that provides an image to the display 1020 through the I/O interface 1050 or the communication interface 1060, whereby an image provided from the external device may be displayed on the display 1020.

The microphone 1070 receives an audio signal from an external source. The audio signal may include a user's voice, and the user's voice may include an instruction for setting a display mode for a source providing an image to the display 1020 of the electronic apparatus 1000. However, the disclosure is not limited thereto, and the user's voice may include various voice instructions that may be interpreted for controlling the electronic apparatus 1000.

According to an embodiment of the disclosure, when a user's voice for displaying a plurality of application recommendation UIs is input from the microphone 1070, the processor 1030 may control the display 1020 to display a recommended UI corresponding to a display mode of the display 1020 based on the input user's voice. That is, the user input according to the disclosure may be input from the microphone 1070 through the user's voice. Specifically, the processor 1030 may receive a user's voice through the microphone 1070 and perform voice recognition on the received user's voice to obtain a user instruction corresponding to the received user's voice. More specifically, the processor 1030 may receive the user's voice through the microphone 1070 and input the received user's voice into a learned artificial intelligence model to obtain a user instruction corresponding to the received user's voice.

In addition, the electronic apparatus 1000 disclosed in FIG. 10 is disclosed to include the microphone 1070, but is not limited thereto, and an external electronic apparatus may receive an audio signal and the electronic apparatus 1000 according to the disclosure may receive the audio signal from the external electronic apparatus.

The speaker 1080 may output audio data under the control of the processor 1030. In particular, in various embodiments according to the disclosure, the speaker 1080 may output voice content provided according to a user instruction. Further, according to an embodiment of the disclosure, when the display 1020 is rotated, the speaker 1080 may output audio indicating that the display is rotated.

Figure 11:
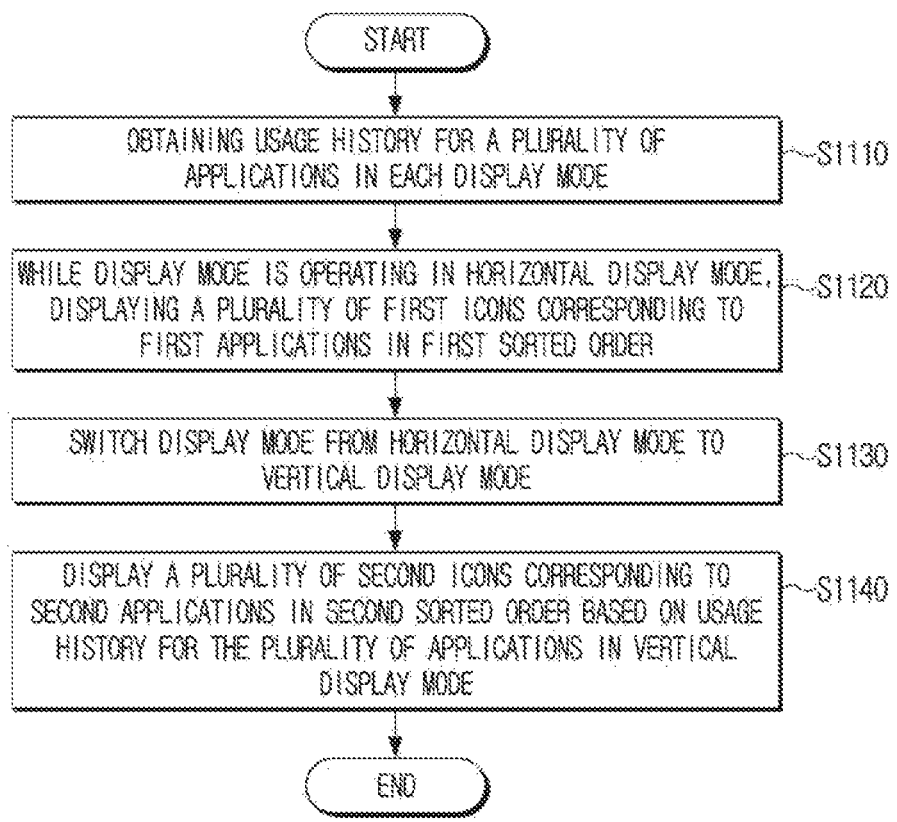
FIG. 11 is a view illustrating a control method of an electronic apparatus according to an embodiment of the disclosure.

FIG. 11 is a view illustrating a control method of an electronic apparatus according to an embodiment of the disclosure.

The electronic apparatus 100 may obtain usage history for a plurality of applications for each display mode (S1110). As an embodiment, the electronic apparatus 100 may acquire usage history of a plurality of applications in the horizontal display mode and usage history of a plurality of applications in the vertical display mode. As an embodiment, the usage history of a plurality of applications may include information on history of a plurality of recently executed applications and information on the frequency with which the various applications have been executed.

Also, while display mode is operating in the horizontal display mode the electronic apparatus 100 may display a plurality of first icons corresponding to a first applications among the plurality of applications in a first sorted order (S1120). The plurality of first icons may be displayed based on a layout corresponding to the horizontal display mode, and in an embodiment, the plurality of first icons may be displayed with a layout in which the horizontal is longer than the vertical. Each of the plurality of first icons may include at least one of thumbnails corresponding to the plurality of icons, names of the corresponding applications, and logos of the corresponding applications. The first sorted order may be an order of applications which have been most frequently used among a plurality of applications in the horizontal display mode or may be an order of applications which have been most recently executed in the horizontal display mode among a plurality of applications. In the above-described embodiment, the first sorted order is described as being identified through usage history of a plurality of applications corresponding to the horizontal display mode, but is not limited thereto. That is, the first sorted order may be a preset sorted order in the electronic device 100. For example, the preset sorted order may be an application name order corresponding to each icon or an installation order of applications corresponding to each icon. Also, the preset sorted order may be set by a user of electronic device 100 or may be set by a manufacturer of the electronic device 100.

When the display mode is switched from the horizontal display mode to the vertical display mode (S1130), the electronic apparatus 100 may display a plurality of second icons corresponding to a second applications among the plurality of applications in a second sorted order based on usage history of the plurality of applications in the vertical display mode (S1140). The plurality of second icons may be displayed based on a layout corresponding to the vertical display mode. In an embodiment, the plurality of second icons may be displayed with a layout in which a length of the vertical dimension thereof is longer than a length of the horizontal dimension thereof. Each of the plurality of second icons may include at least one of thumbnails corresponding to the plurality of icons, names of the corresponding applications, and logos of the corresponding applications. The second sorted order may be an order of applications which have been most frequently used among a plurality of applications in the vertical display mode or may be order of applications which have been most recently executed in the vertical display mode among a plurality of applications.

The embodiments of the disclosure may be variously modified and embodied, so specific embodiments are illustrated in drawings and described in detail. However, it should be appreciated that the disclosure is not limited to a specific embodiment and all modifications, equivalents and/or alternatives thereof also belong to the scope of the disclosure. The same reference numerals are used throughout the drawings to refer to the same or like parts.

In describing the disclosure, if a detailed description for a related known function or construction is considered to unnecessarily divert the gist of the disclosure, such explanation has been omitted but would be understood by those skilled in the art.

The disclosure may be embodied in many different forms and should not be construed as being limited to the embodiments set forth herein; rather, these embodiments are provided so that this disclosure will be thorough and complete, and will fully convey the concept of the disclosure to those of ordinary skill in the art.

Terms used in the present specification are used only in order to describe specific exemplary embodiments rather than limiting the disclosure. Singular forms are intended to include plural forms unless the context clearly indicates otherwise.

In the disclosure disclosed herein, the expressions "have," "may have," "include" and "comprise," or "may include" and "may comprise" used herein indicate existence of corresponding features (e.g., elements such as numeric values, functions, operations, or components) but do not exclude presence of additional features.

In the disclosure disclosed herein, the expressions "A or B," "at least one of A or/and B," or "one or more of A or/and B," and the like used herein may include any and all combinations of one or more of the associated listed items. For example, the term "A or B," "at least one of A and B," or "at least one of A or B" may refer to all of the case (1) where at least one A is included, the case (2) where at least one B is included, or the case (3) where both of at least one A and at least one B are included.

The terms, such as "first," "second," and the like used herein may refer to various elements of various embodiments of the disclosure, but do not limit the elements.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

However, when it is described that an element (e.g., first element) is "directly coupled" to another element (e.g., second element), no element (e.g., third element) may exist between the element and the other element.

According to the situation, the expression "configured to" used herein may be used as, for example, the expression "suitable for," "having the capacity to," "designed to," "adapted to," "made to," or "capable of". The term "configured to" must not mean only "specifically designed to" in hardware.

Instead, the expression "a device configured to" may mean that the device is "capable of" operating together with another device or other components. CPU, for example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

In the description, the word "module" or "unit" refers to a software component, a hardware component, or a combination thereof, which is capable of carrying out at least one function or operation. A plurality of modules or units may be integrated into at least one module and implemented using at least one processor except for those modules or units that need to be implemented in specific hardware.

Various elements and regions in the drawings are schematically drawn. Therefore, the technical concept of the disclosure is not limited by a relative size or spacing drawn in the accompanying drawings.

Various embodiments described above may be implemented in a computer or similar device-readable recording medium using software, hardware, or a combination thereof. In the case of implementation by hardware, embodiments described in this disclosure may be implemented using at least one of application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, electronic units performing other functions. In some cases, embodiments described in this disclosure may be implemented by the processor 160 itself. In the case of software implementation, embodiments such as procedures and functions described in this disclosure may be implemented as separate software modules. Each of the software modules may perform one or more functions and operations described in this disclosure.

The image processing method according to various embodiments described above may be stored in a non-transitory readable medium. Such a non-transitory readable medium may be installed and used in a variety of devices.

Such a non-transitory readable medium is not a medium for storing data for a short time such as a register, cache or memory, but refers to a medium that semi-permanently stores data and may be read by a device. Specifically, programs for performing various methods described above may be stored in the non-transitory readable medium may include a CD, DVD, hard disk, Blu-ray disc, USB, memory card, ROM, and the like, and provided.

According to embodiments, the methods according to various embodiments disclosure in this document may be included in a computer program product and provided. The computer program product may be traded as goods between a seller and a purchaser. The computer program product may be distributed as a device-readable storage medium (e.g., compact disk read only memory (CD-ROM)) or online through an application store (e.g., play Store™). In the case of online distribution, at least part of the computer program product may be temporarily stored or temporarily created in a storage medium such as a server of a manufacturer, a server of an application store, or a memory of a relay server.

Hereinabove, the embodiment of the disclosure have been described but the disclosure is not limited to the specific embodiment and may be variously modified by a person skilled in the art to which the disclosure pertains without departing from the scope of the disclosure as claimed in the appended claims and such modifications should not be individually understood from technical concepts or prospects of the disclosure.

What is claimed is:

1. An electronic apparatus comprising:
a display;
a motor configured to rotate the display;
a memory configured to store at least one instruction; and
a processor configured to execute the at least one instruction stored in the memory to control the electronic apparatus and to control the display to operate in a display mode among a horizontal display mode and a vertical display mode,
wherein the processor configured to:
obtain usage history for a plurality of applications in each of the horizontal display mode and the vertical display mode,
control the display to display a user interface in a first side area of the display while the display is operating in the horizontal display mode, and display the user interface in a second side area of the display while the display is operating in the vertical display mode, wherein the second side area of the display in the vertical display mode corresponds to the first side area of the display in the horizontal display mode,
control the display to display a plurality of first icons corresponding to first applications among the plurality of applications in the first side area in a first sorted order, while the display is operating in the horizontal display mode, each of the plurality of first icons being displayed with a first aspect ratio in which a horizontal length of the first icons is longer than a vertical length of the first icons, and
control the display to display a plurality of second icons corresponding to second applications among the plurality of applications in the second side area in a second sorted order based on the usage history for the plurality of applications in the vertical display mode, based on the display mode being switched from the horizontal display mode to the vertical display mode by the motor, each of the plurality of second icons being displayed with a second aspect ratio in which a vertical length of the second icons is longer than a horizontal length of the second icons, and
wherein a first horizontal length of the first side area is different from a second horizontal length of the second side area, or a first vertical length of the first side area is different from a second vertical length of the second side area.

2. The electronic apparatus as claimed in claim 1, wherein the first sorted order is identified based on the usage history for the plurality of applications in the horizontal display mode and the first sorted order is a first order of most frequently used applications during the horizontal display mode, and
the second sorted order is a second order of most frequently used applications during the vertical display mode.

3. The electronic apparatus as claimed in claim 1, wherein the first sorted order is identified based on the usage history for the plurality of applications in the horizontal display mode and the first sorted order is a first order of most recently executed applications in the horizontal display mode, and
the second sorted order is a second order of most recently executed applications in the vertical display mode .

4. The electronic apparatus as claimed in claim 1, further comprising:
a communication interface, wherein when executing the at least one instruction the processor is further configured to receive the usage history for the plurality of applications from an external server through the communication interface.

5. The electronic apparatus as claimed in claim 1, wherein the plurality of first icons comprises thumbnails for the first applications, and
the plurality of second icons comprises thumbnails for the second applications.

6. The electronic apparatus as claimed in claim 1, wherein the processor when executing the at least one instruction is further configured to identify display modes respectively corresponding to a plurality of contents included in a first application among the plurality of applications, and to control the display to display at least one content corresponding to the horizontal display mode among the plurality of contents based on an icon corresponding to the first application among the plurality of first icons selected during an operation in the horizontal display mode.

7. The electronic apparatus as claimed in claim 6, wherein the processor when executing the at least one instruction is further configured to control the display to display at least one content corresponding to the vertical display mode among the plurality of contents based on switching from the horizontal display mode to the vertical display mode.

8. The electronic apparatus as claimed in claim 7, wherein the processor is configured to control the display to display the at least one content corresponding to the horizontal display mode among the plurality of contents as top priority and to display the at least one content corresponding to the vertical display mode among the plurality of contents as next priority.

9. The electronic apparatus as claimed in claim 1, wherein the processor is configured to control the motor to rotate the display based on an event detected to switch between the horizontal display mode and the vertical display mode.

10. A method of controlling an electronic apparatus that is rotatable, the method comprising:
obtaining usage history for a plurality of applications in each of a horizontal display mode and a vertical display mode of a display of the electronic apparatus;
displaying a user interface in a first side area of the display while the display is operating in the horizontal display mode, and displaying the user interface in a second side area of the display while the display is operating in the vertical display mode, wherein the second side area of the display in the vertical display mode corresponds to the first side area of the display in the horizontal display mode
displaying a plurality of first icons corresponding to first applications among the plurality of applications in the first side area in a first sorted order, while the display is operating in the horizontal display mode, each of the plurality of first icons being displayed with a first aspect ratio in which a horizontal length of the first icons is longer than a vertical length of the first icons; and
displaying a plurality of second icons corresponding to second applications among the plurality of applications in the second side area in a second sorted order based on the usage history for the plurality of applications in the vertical display mode, based on a display mode of the display being switched from the horizontal display mode to the vertical display mode by a motor of the electronic apparatus rotating the display, each of the plurality of second icons being displayed with a second aspect ratio in which a vertical length of the second icons is longer than a horizontal length of the second icons,
wherein a first horizontal length of the first side area is different from a second horizontal length of the second side area, or a first vertical length of the first side area is different from a second vertical length of the second side area.

11. The method as claimed in claim 10, wherein the first sorted order is identified based on the usage history for the plurality of applications in the horizontal display mode and the first sorted order is a first order of most frequently used applications during the horizontal display mode, and
the second sorted order is a second order of most frequently used applications during the vertical display mode.

12. The method as claimed in claim 10, wherein the first sorted order is identified based on the usage history for the plurality of applications in the horizontal display mode and the first sorted order is a first order of most recently executed applications in the horizontal display mode, and
the second sorted order is a second order of most recently executed applications in the vertical display mode.

13. The method as claimed in claim 10, wherein the obtaining comprises receiving the usage history for the plurality of applications from an external server through a communication interface.

14. The method as claimed in claim 10, wherein the plurality of first icons comprises thumbnails for the first applications, and
the plurality of second icons comprises thumbnails for the second applications.

15. The method as claimed in claim 10, further comprising:
identifying display modes respectively corresponding to a plurality of contents included in a first application among the plurality of applications; and displaying at least one content corresponding to the horizontal display mode among the plurality of contents based on an icon corresponding to the first application among the plurality of first icons selected during an operation in the horizontal display mode.

16. The method as claimed in claim 15, further comprising:
displaying at least one content corresponding to the vertical display mode among the plurality of contents based on switching from the horizontal display mode to the vertical display mode.

17. The method as claimed in claim 16, wherein the displaying comprises displaying the at least one content corresponding to the horizontal display mode among the plurality of contents as top priority and to display the at least one content corresponding to the vertical display mode among the plurality of contents as next priority.

18. The method as claimed in claim 10, wherein the displaying in the second sorted order further comprises:
controlling the motor to rotate the display based on an event detected to switch between the horizontal display mode and the vertical display mode.

19. The electronic apparatus as claimed in claim 1, wherein the first horizontal length of the first side area is longer than the second horizontal length of the second side area or the first vertical length of the first side area is shorter than the second vertical length of the second side area.

* * * * *